Sept. 24, 1968      L. K. WANLASS      3,403,323
ELECTRICAL ENERGY TRANSLATING DEVICES AND
REGULATORS USING THE SAME
Filed May 14, 1965      9 Sheets-Sheet 1

INVENTOR.
LESLIE KENT WANLASS
BY Lyon Lyon
ATTORNEYS

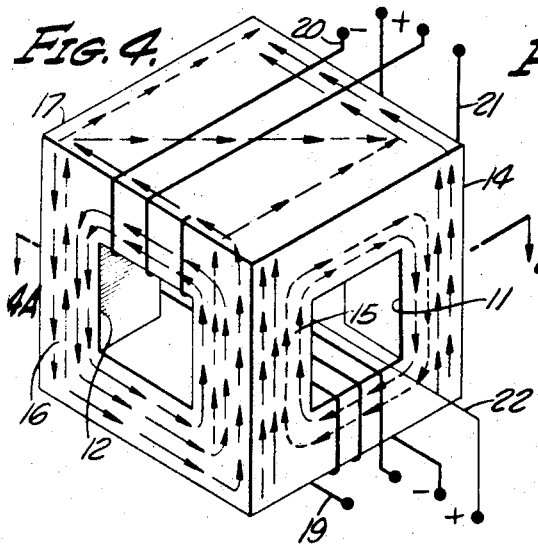
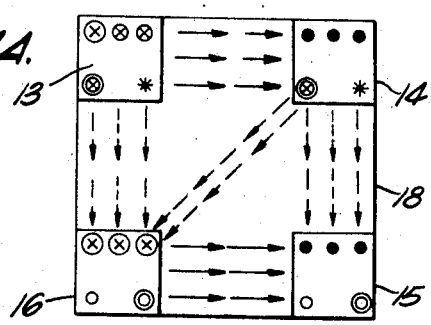
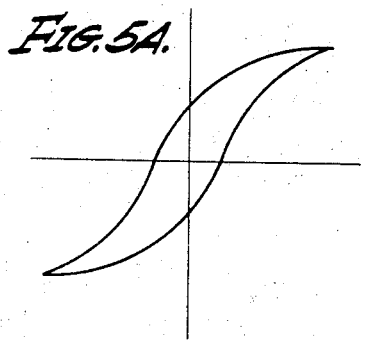
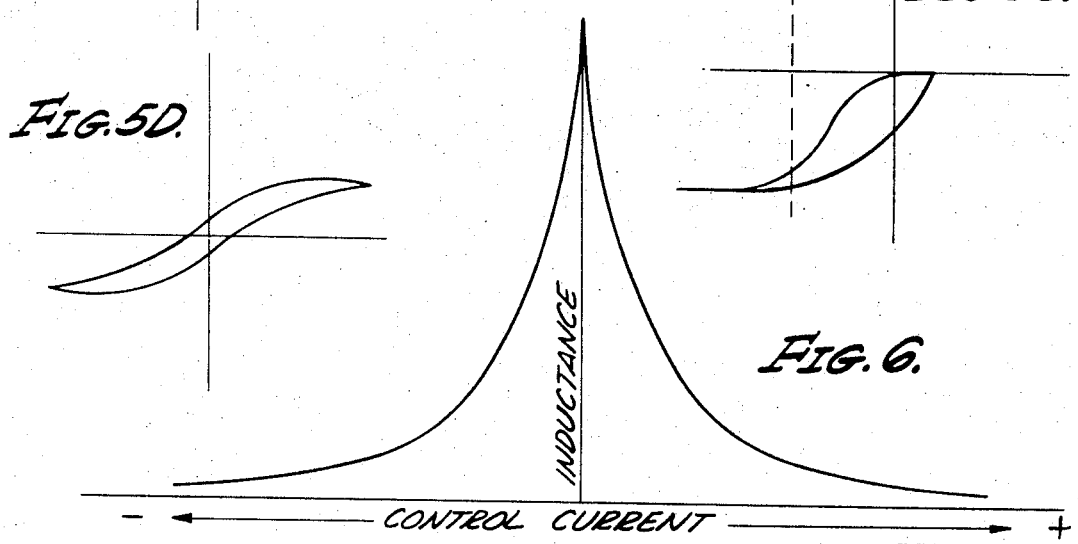

Sept. 24, 1968
L. K. WANLASS
3,403,323
ELECTRICAL ENERGY TRANSLATING DEVICES AND
REGULATORS USING THE SAME
Filed May 14, 1965
9 Sheets-Sheet 3
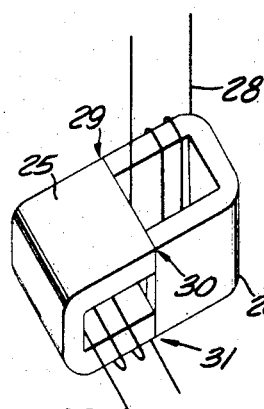
FIG. 7.
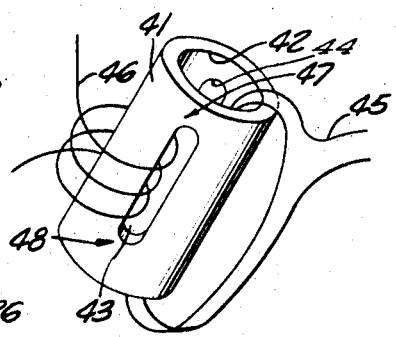
FIG. 9.
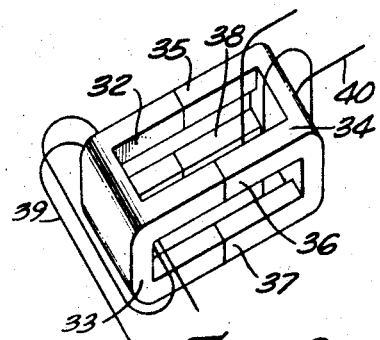
FIG. 8.
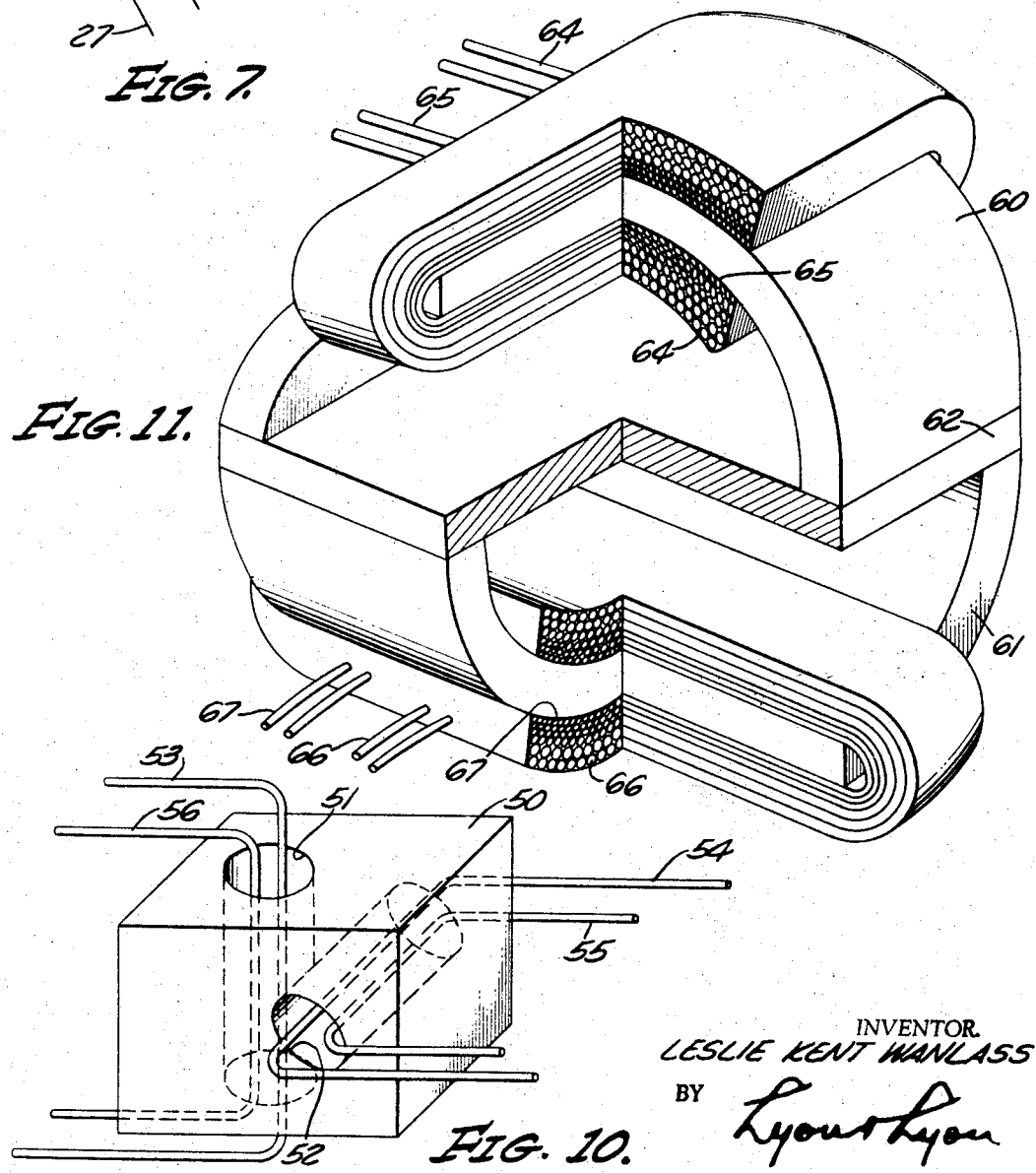
FIG. 11.
FIG. 10.
INVENTOR.
LESLIE KENT WANLASS
BY
Lyon Lyon
ATTORNEYS INVENTOR.
LESLIE KENT WANLASS
BY
*Lyon+Lyon*
ATTORNEYS Sept. 24, 1968         L. K. WANLASS          3,403,323
ELECTRICAL ENERGY TRANSLATING DEVICES AND
REGULATORS USING THE SAME
Filed May 14, 1965                        9 Sheets-Sheet 5
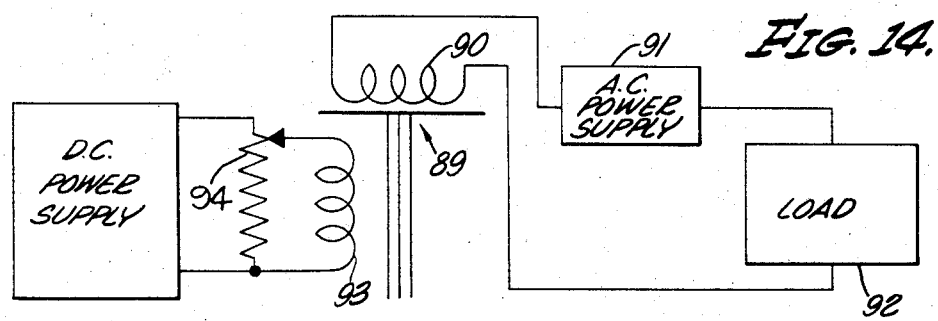
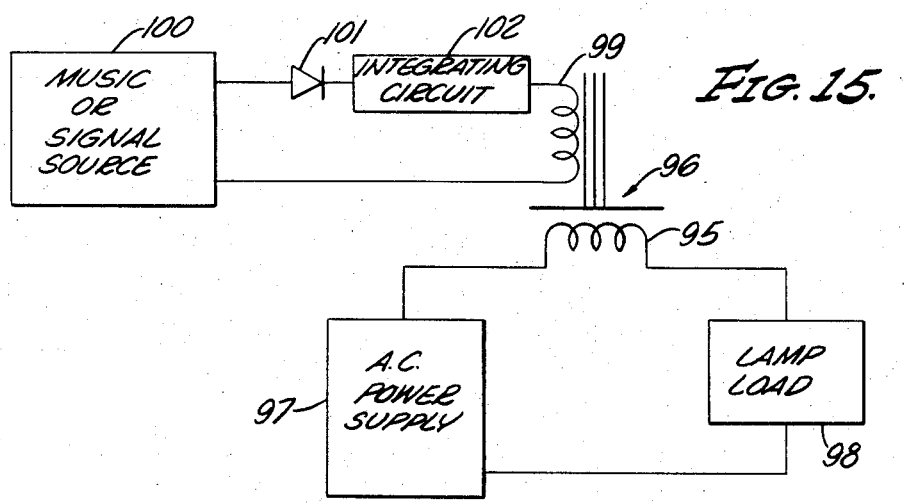
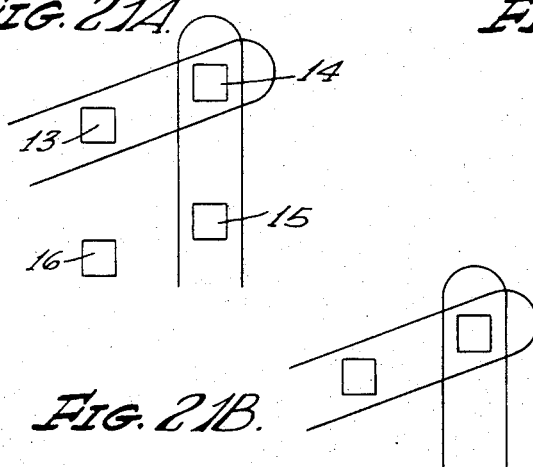
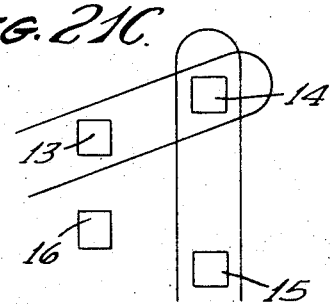
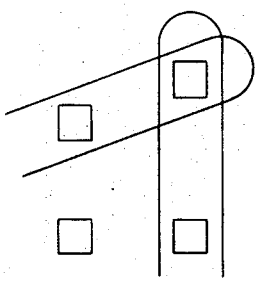
INVENTOR.
LESLIE KENT WANLASS
BY
*Lyon & Lyon*
ATTORNEYS

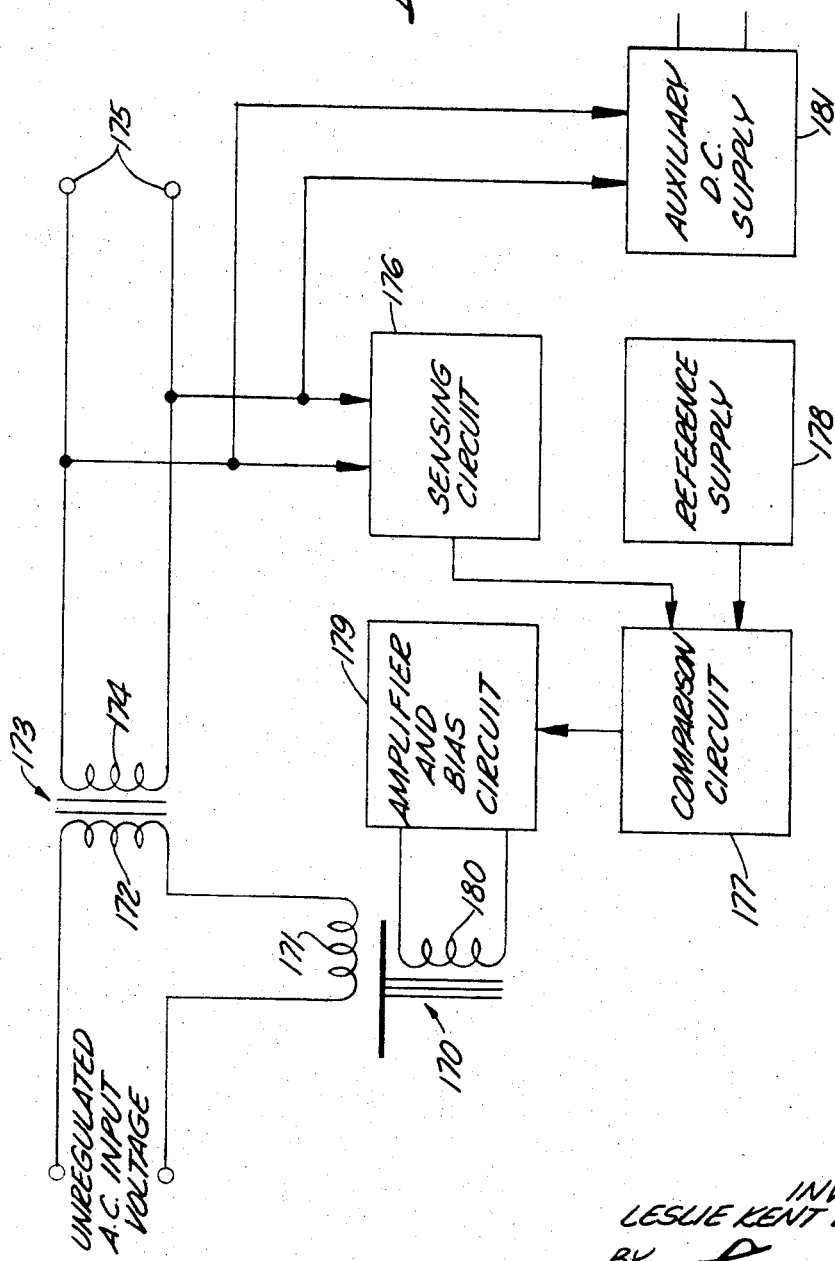

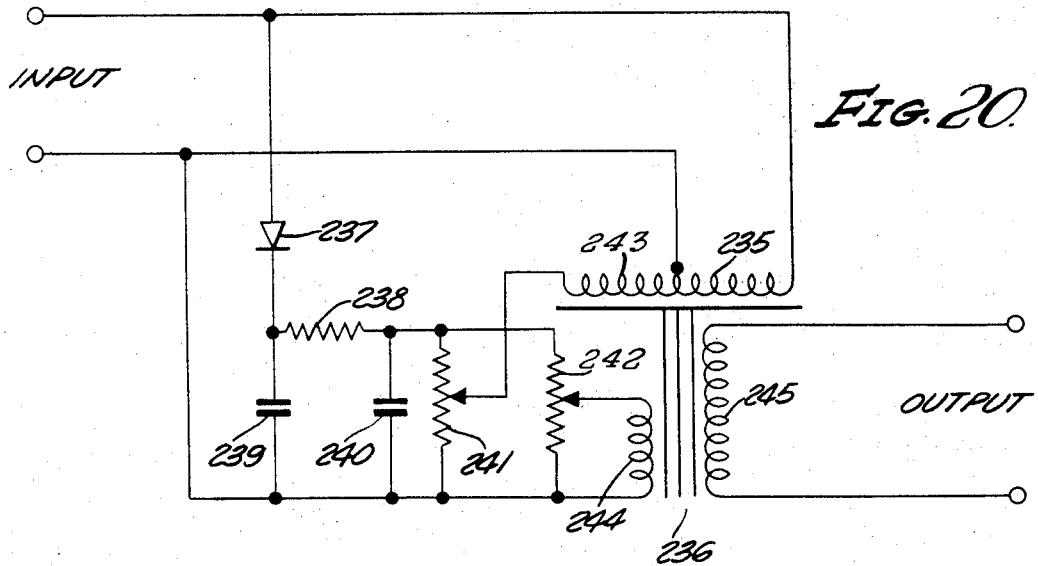

United States Patent Office

3,403,323
Patented Sept. 24, 1968

3,403,323
ELECTRICAL ENERGY TRANSLATING DEVICES AND REGULATORS USING THE SAME
Leslie Kent Wanlass, Newport Beach, Calif., assignor, by mesne assignments, to Wanlass Electric Company, Santa Ana, Calif., a corporation of California
Continuation-in-part of application Ser. No. 857,083, Dec. 3, 1959. This application May 14, 1965, Ser. No. 455,939
92 Claims. (Cl. 323—56)

This is a continuation-in-part of my copending application Ser. No. 857,083, filed Dec. 3, 1959, for "Ferromagnetic Signal Transfer Device," now abandoned.

This invention relates to ferromagnetic signal translating devices and more particularly relates to such devices, the effective operation of which takes place substantially in the non-saturated portions of their magnetization curves.

The properties of ferromagnetic materials have long been utilized in the design and construction of components for electrical circuitry. Signal translating devices which make use of the property of magnetization range from a simple inductor comprising a coil wrapped around a ferromagnetic core to complicated magnetic amplifiers and saturable transformers. Such devices are particularly useful because they permit the easy control of their primary electrical characteristics. This control, moreover, is itself electrical and thus permits a wide selection of control functions. For example, if it is desired to control the average impedance in a line, a saturable reactor can be utilized and the average impedance of the reactor to the line signal varied as a function of a DC control current applied to the control winding of the reactor. The principle of operation of such saturable reactors is well known and they are widely used. On the other hand, if it is desired to electrically control the coupling between primary and secondary windings of a transformer, they can be wound around a core and the flux linkage controlled by the current applied to a control winding. Ordinarily, this control is exercized by varying the flux density of a shunt leg of the core positioned between the primary and secondary legs to cause differing amounts of flux from the primary to traverse the shunt leg.

In both the saturable reactor and the saturable transformer discussed above, control depends upon the core being driven into saturation.

This switching type operation results in distortion which in many cases is unacceptable. In order to increase the power capacity of such devices, the art has turned to larger and larger volume cores so that the range of signals that can be handled is increased. Regardless of the size of the cores, however, such devices cannot provide control over a large range and invariably introduce unacceptable distortion into the line signal. Moreover precautions must be taken to insure that the AC signal, in the load winding, in the case of a saturable reactor, and the primary winding in the case of a saturable transformer, does not induce a large signal in the DC control winding. This is generally prevented by providing a pair of AC windings which are so related to the DC winding that the AC fluxes generated by them are cancelled out. While this is satisfactory, it further adds to the size, cost and complexity of the device.

According to the present invention, signal translating devices are provided which overcome the major disadvantages of previously known magnetic core devices. The devices of the present invention are arranged such that operation takes place without the requirement of saturating the magnetic circuit and consequently distortion can be greatly reduced in the signal translation. In addition, the range of control of the present devices is very much greater than those devices presently known. The present devices may be made much smaller in size, less complex, and consequently less expensive than presently obtainable devices. All of these desirable features result from the provision of devices having cores in at least one portion of which a control current generated flux component and an AC generated flux component are in opposition at all times, i.e., on both halves of the AC cycle. As a result, the complete path of the AC flux within the core is not saturated and the composite B–H characteristic of the core can be maintained within its non-saturated region. Since these two flux components always are in opposition in at least one portion of the path of the AC generated flux component, an increase in control current, which may, for example be DC, means that an increase in AC current can be tolerated without distortion. This is, of course, opposite to the situation present in the present day devices where a larger DC current means that the AC signal must be correspondingly reduced.

Because the sense of the AC generated flux component reverses every half cycle, and the sense of a DC generated flux component remains constant, in order to have a core having at least one portion in which at all times the DC flux component and the AC flux component are in opposition, it is necessary to provide the core with four regions in which both the AC and the DC flux components appear and two end or joining portions for magnetically coupling the common regions. For the sake of convenience, the common regions will hereafter be referred to as "legs" although it should be understood that it is not necessary to have a structure in which actual structurally identifiable legs are present. By properly positioning a pair of coils on such a core, a DC flux component can be caused to follow paths through legs 1 and 2 and through legs 3 and 4 and an AC flux component caused to follow paths through legs 1 and 4 and through legs 2 and 3. The AC flux component, of course, reverses its direction each half cycle. These relationships will be described in greater detail in connection with the drawings.

On each half cycle, however, AC and DC flux components will exist in each leg and will be in opposition in a first pair of diagonal legs and in addition in the other pair of diagonal legs. For example, for a first sense of the AC flux component, legs 1 and 3 may have the AC and DC flux components in opposition while legs 2 and 3 will have these flux components in additive relationship. It can thus be seen that each of the two legs in each of the paths of the AC flux will be at different points on the magnetization curve of the core material. The leg in which the flux components are additive (the additive leg) will be relatively far out on the magnetization curve and consequently will have a lower permeability and a higher reluctance while the leg in which the flux components are in opposition (the bucking or opposing leg) will have a higher permeability and a lower reluctance. As used in this specification, the terms "higher" and "increased" and "lower" and "decreased" as applied to permeability and reluctance are, of course, meant to be relative to the permeability and reluctance of the core when only the larger flux is present, or to state it another way, "lower" or "reduced" reluctance means the reluctance is closer to the nominal reluctance of the core material and "higher" or "increased" reluctance means the reluctance is further from the nominal reluctance.

Since the total magnetic circuit encompassed by the load winding will include an additive leg and a bucking leg, the composite B–H characteristic of the circuit will be a composite of the two and will have a lower average permeability than would the same path without the presence of the DC flux component. The average permeability of the path will decrease as the DC flux component is increased and consequently the composite B–H curve will be caused to rotate in a clockwise direction. Such a rotation indicates a decrease in average permeability and a corresponding decrease in average inductance presented to AC or the load winding, and consequently it can be seen that by increasing the DC flux component, the inductance presented to the load winding is decreased. The device of the present invention can thus be likened to a conventional ferromagnetic core having a variable air gap therein.

When constructing a variable inductance device in accordance with the present invention, the AC winding and the DC winding are preferably positioned on the core so that there is little or no voltage induced in the DC winding over the preferred operating range. This is conveniently done by positioning the windings at right angles, that is, with their axes transverse. As pointed out above, in one portion of its path, the AC generated flux is called upon to travel from a leg, for example, leg 4, of high permeability to a leg, leg 1, of low permeability. The flux passing through leg 4 could, however, also complete a path by diagonally crossing the end portion and travelling through high permeability leg 2 instead of low permeability leg 1. Since reluctance to magnetic flux can be approximately expresed as:

$$R = \frac{l}{\mu A}$$

where:

$R$ = reluctance
$l$ = length of path
$\mu$ = permeability
$A$ = area of the path it can be seen that if the DC flux component is made high enough, a point will be reached as the AC flux component increases where the permeability in leg 2 will be sufficiently lower than the permeability in leg 1 that the differences in the length of the path between leg 4 and leg 1 and leg 4 and leg 2 will be overcome and some of the flux from leg 4 will complete its path through leg 2.

As a result of this "crossover" flux, an AC voltage will be induced in the DC winding. For low values of DC or AC current, however, the effect of this crossover flux will be negligible and will not effect the inductance of the AC winding. The DC winding can be provided with a suitable choke to suppress the AC voltage induced therein as a result of the crossover flux.

According to the present invention a variable transformer can be provided by winding a further winding on the core with its axis parallel to that of the DC winding, this third winding being the secondary of the transformer and the aforementioned AC winding being the primary. In the absence of any DC control current there is substantially no coupling between the primary and the secondary windings because they are wound about transverse axes. As the DC control current is increased, there is an increased transfer of power from the primary to the secondary winding. The operation of such a variable transformer can best be explained in the following manner.

Consider that the primary current sets the level of the inductance of the secondary winding. As the primary current increases, the inductance of the secondary winding decreases and the voltage induced therein increases since:

$$V_s = -\frac{d\phi_s}{dt}$$

$$\phi_s = \frac{L}{N} i_s$$

$$V_s = -\frac{d\phi_s}{dt} = -\frac{1}{N}\left(L\frac{di_s}{dt} + i_s\frac{dL}{dt}\right)$$

If the frequency of the control voltage is much less than the frequency of the primary, $$L\frac{di_s}{dt}$$

becomes inconsequential. Therefore:

$$V_s = \frac{1}{N}\left(i_s\frac{dL}{dt}\right)$$

It can thus be seen that the voltage induced in the secondary is dependent on the change of inductance which is caused by the fluctuation of the primary current. As the primary current increases, L (of the secondary) decreases and the voltage induced in the secondary increases.

The phenomenon of crossover flux also contributes to the development of a voltage in the secondary winding of the transformer. As the secondary winding is wound with its axis parallel to that of the DC winding, the crossover flux will cut the turns of the secondary winding and induce a voltage therein. As the DC control current becomes greater the permeability in the various legs will change as will the reluctance of the various paths so that more and more crossover flux is produced as the AC current increases and more and more voltage is consequently induced in the secondary windings. For very high DC and AC flux component values, a significant part of the AC flux can be caused to cross over with a resulting voltage being induced in the secondary winding. It appears, however, that at normal operating levels, the greater portion of the power transfer occurs as a result of the inductance phenomena explained above.

The theories expressed above are believed to describe the physical phenomena present in the system and are believed to be more accurate than those expressed in my above-mentioned copending application. However, it should be understood that the principles governing the operation of the devices of the present invention have not been completely developed and it is possible that further theoretical bases for operation will be discovered. The theories discussed in this application, and in my copending application, should therefore be taken only as the best presently available and are not meant in any way to limit the scope of the present invention.

While the foregoing theoretical description has discussed the devices of the present invention as variable inductors and variable transformers, the devices, by their nature, may be used in many different kinds of circuits, even in circuits where a conventional variable inductor or variable transformer would or could not be used. For example, the variable inductor has been described primarily with regard to a device wherein the impedance presented to an AC load winding is varied by varying the direct current in a control winding. Such a device has obvious utility in regulators and the like. However, there are additional ways in which the variable inductor could be used. Thus, in addition to the situation where the load signal is AC and the control signal is DC, the load signal could be DC and the control signal AC or both the load signal and the control signal could be AC as will be more fully described.

The variable transformer of the present invention may be operated in either of two modes; a frequency doubling mode and a non-frequency doubling mode. In the first of these modes, the frequency of alternating current signals are doubled in transfer from the primary to the secondary circuit.

The frequency doubling phenomena can also best be explained in terms of inductance. As pointed out above, the primary current sets the level of the inductance of the secondary winding. Inductance is, of course, an absolute quantity and thus the inductance of the secondary winding changes twice for each cycle of primary current and hence the output has a double frequency. The crossover flux phenomenon also provides a partial explanation for the frequency doubling phenomenon. At proper input levels, when an alternating current signal is applied to the primary winding, a voltage will be induced in the secondary winding at twice the input frequency. This occurs because in each half cycle of the alternating current input, the diagonal path followed by the crossover flux switches; for example, on the first half cycle the flux will cross over from leg 1 to leg 3 while on the second half cycle the flux will switch and cross over from leg 2 to leg 4. However, each of these diagonal paths cuts the secondary winding in the same direction and consequently the voltage induced in the secondary will be in the same direction regardless of the diagonal followed by the crossover flux. The secondary winding thus in effect sees the modified absolute value of the input such as is done by a full wave rectifier. When a modified absolute value is taken of a sine wave, the result is an output waveform with twice the frequency of the input.

Since the alternating flux component in the legs is essential to set up the proper reluctance pattern, the crossover flux is not immediately responsive to the input but rather builds up slowly, as the slope of the output waveform is zero at the time that the slope of the input waveform is maximum, that is, when it crosses zero. The same phenomena also acts at the end of each half cycle of the input with the result that the output waveform is rounded out and has a frequency twice that of the input although somewhat distorted.

The variable transformer of the present invention can also be operated in a non-frequency doubling mode by establishing a bias flux in the paths followed by the alternating flux of a magnitude sufficient to insure that the direction of the composite bias and alternating flux does not reverse, that is, by setting the magnitude of the bias flux at least as high as the maximum alternating flux.

The non-doubling mode is also explained in accordance with the inductance theory. If the primary flux never crosses zero, there is only one point in each cycle of the input where the inductance of the secondary is a minimum—the peak of the positive going half cycle. Similarly there is only one point of maximum inductance—the peak of the negative half cycle. Since the control current never changes sign, there is no absolute value taken and consequently the output has the same frequency as the input.

From the standpoint of the crossover flux phenomena, it can be seen that with the high bias flux, the same pair of diagonal legs will always have the lower reluctance and the crossover flux will always follow the same diagonal path. The waveform of the crossover flux will not follow the input current waveform because the lower reluctance of the legs is already established by the primary bias and hence as soon as the alternating flux begins to increase, it will begin to cross over. The crossover flux will rise to a maximum when the alternating current input is at a maximum and follow its decline. When the alternating current passes its zero level, however, the crossover flux will still be in the same diagonal and in the same direction and the output will continue to decrease until the input again begins to increase. This is unlike the non-biased case where the diagonal switched when the input crossed zero and the crossover flux again began to increase.

As pointed out in my above identified copending application, which is incorporated by reference herein, the variable transformer embodiment of the present invention also has many uses. For example, it may be used as a variable autotransformer wherein the primary and secondary windings of the transformer of the invention are fixed in physical relationship to each other. The desired action is then accomplished by varying the degree of coupling between the primary and the secondary through modification of the control field. This arrangement of the invention makes it possible to accomplish the advantages of the prior art systems with a much less complex arrangement and one which may be controlled by simple electrical means. As is well known, the typical variable autotransformer comprises a transformer with a secondary winding which can be tapped to connect in more or less turns. While this method of varying AC voltage avoids the losses inherent in variable voltage dividing networks it requires mechanical control. In the present invention, however, the amount of coupling can be electrically controlled, thereby eliminating the necessity for electric control motors and the like.

It is apparent, of course, that either the doubling or non-doubling mode can be employed when the transformer is used as a variable transformer. When the former mode is employed, the frequency may be doubled and the amplitude of the output signal continuously controlled.

Another system in which the transformer of the present invention is particularly useful is that of a DC power regulator. In conventional DC power supplies, a low voltage AC power source is normally raised to a desired voltage level in a power transformer, changed to pulsating DC in a rectifier circuit, and filtered to approximate DC in a filter circuit. The output amplitude of the power supply is customarily controlled by variable impedances in series with the flow of energy through the circuit. According to the present invention, the power transformer is replaced by a frequency doubling transformer as described above, which provides two very important improvements: (1) a 50% reduction of ripple in the output voltage with the same filter circuit, or a 50% reduction in filter size with no increase in output ripple; (2) a built-in output voltage control which is not in series with the flow of energy, and which can be varied without affecting circuit losses, and which can be remotely controlled in an extremely simple manner.

In regulated power supplies, this invention provides the additional advantages of a built-in regulation circuit. In prior art regulated power supplies, a feed-back signal was employed to vary the impedance of a variable element, such as a vacuum tube, transistor, or saturable reactor, which was connected in series with the energy flow through the circuit. In this method, the variable element was necessarily large to accommodate the energy flow, and energy was necessarily wasted therein. The regulated power supply of the present invention overcomes these difficulties by utilizing the control winding of the variable transformer as the variable control element, thereby eliminating the separate variable element formerly employed. Furthermore, the output is controlled at a low energy point in parallel with the energy flow through the circuit, rather than in series, with the result that losses are reduced. If desired, of course, the non-doubling mode of operation could also be employed in such a circuit.

It is an object of the present invention to provide a magnetic electrical energy translating device in which the magnitude of the energy being translated can be electrically varied.

It is another object of the present invention to provide such a device which is smaller than those presently available but which nevertheless has a greater energy translating capacity.

It is also an object of the present invention to provide such a device which has a greater range through which control can be exercised without unduly distorting the waveform of the input thereto.

It is a further object of the present invention to provide an improved variable inductance device.

It is a still further object of the present invention to provide such a variable inductance device in which the inductance can be varied electrically.

It is yet a further object of the present invention to provide a ferromagnetic variable inductance device the inductance of which can be varied without saturating the device.

It is a still further object of the present invention to provide various novel circuits incorporating such an improved variable inductance device.

It is another object of the present invention to provide an improved variable transformer.

It is also an object of the present invention to provide such a variable transformer in which the degree of coupling can be varied electrically.

It is a further object of the present invention to provide a ferromagnetic variable transformer device the degree of coupling of which can be varied without saturating the device.

It is also an object of the present invention to provide a ferromagnetic control device having a load winding and a control winding in which there is negligible coupling between the windings over the normal operating range.

It is yet another object of the present invention to provide a ferromagnetic signal transfer device in which electrical signals can be modified according to several modes of operation, including an amplitude control mode, a frequency doubling mode and a non-frequency doubling mode.

Still another object of the present invention is to provide an improved variable transformer which is simpler, more compact, and more reliable than any variable transformers previously known.

Other objects and advantages of the present invention will become more apparent upon reference to the accompanying description and drawings in which:

FIGURES 1, 2, 3 and 4 show a first embodiment of the present invention and illustrate the principles of operation thereof;

FIGURES 1A, 2A, 3A and 4A are views taken along lines 1A—1A; 2A—2A; 3A—3A and 4A—4A of FIGURES 1 through 4 respectively, with the winding removed for the sake of clarity;

FIGURE 5A illustrates the magnetization curve of a flux path in the core shown in FIGURES 1 through 4 when only a single flux generating means is present;

FIGURES 5B and 5C show the magnetization curves of the individual legs of the core shown in FIGURES 1 through 4 through which pass two fluxes in opposing relationship during one-half cycle and in additive relationship during the other half cycle of an AC current;

FIGURE 5D shows the composite magnetization curve of the core shown in FIGURES 1 through 4 which includes one leg in which two independently generated fluxes are in opposing relationship and one leg in which the fluxes are in additive relationship during one-half cycle and vice versa during the other half cycle of the AC current;

FIGURE 6 shows the relationship between control current and inductance in a device constructed according to the present invention;

FIGURE 7 shows a second embodiment of the present invention;

FIGURE 8 shows a third embodiment of the present invention;

FIGURE 9 shows a fourth embodiment of the present invention;

FIGURE 10 is a simplified representation of a fifth embodiment of the present invention;

FIGURE 11 shows a sixth embodiment of the present invention;

FIGURE 14 is a schematic diagram of a variable inductor circuit according to the present invention;

FIGURE 15 is a schematic diagram of a dynamic light control circuit utilizing the variable inductor according to the present invention;

FIGURE 16 is a schematic diagram of an AC voltage regulator utilizing the variable inductor of the present invention;

FIGURE 20 is a schematic diagram of a variable transformer according to the present invention; and FIGURES 21A, 21B, and 21C are schematic representations of cores constructed according to the present invention in which the windings are not arranged at right angles.

Figure 1:
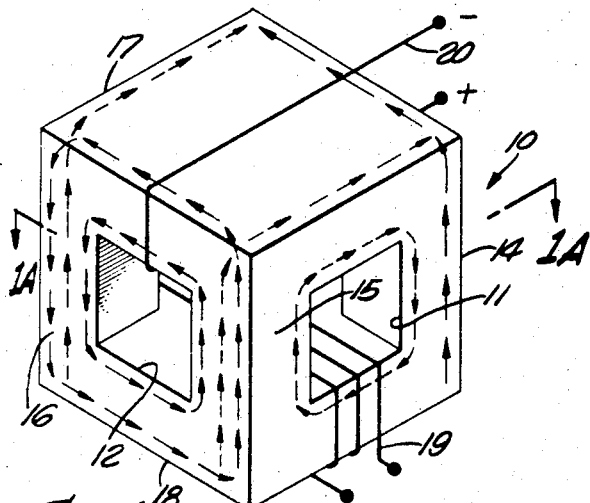

The principles of operation of the present invention as discussed above may further be explained by reference to FIGURES 1, 1A, 2, 2A, 3, 3A, 4 and 4A together with the magnetization curves shown in FIGURES 5A, 5B, 5C and 5D. Since FIGURES 1 through 4 differ only in operating condition, similar elements are identified by the same reference numerals. Referring now to FIGURE 1, a ferromagnetic core 10 is provided with intersecting transverse openings or passageways 11 and 12. The core is thus provided with four legs or common regions 13, 14, 15 and 16, and end or cap regions 17 and 18 which join the legs with a mass of ferromagnetic material. A first winding 19 is wound around the cap region 18 through the opening 11 while a second winding 20 is wound around the cap region 17 through the opening 12.

The following explanation will discuss the operation of the device in its simplest form, that is, where an alternating current is applied to one winding, for example, the winding 19, and a direct current is applied to the winding 20, the unidirectional flux generated by the current in the winding 20 controlling the permeability of the path followed by the flux generated by the alternating current in the winding 19. It should be understood, however, the other combinations of currents could be used as explained above and as further explained below. In this specification, the winding in the circuit being controlled will for convenience often be called the load winding while the winding in the circuit effecting the control will be called the control winding.

Figure 1A:
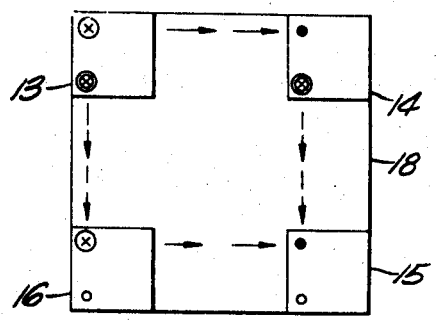

As shown in FIGURES 1 and 1A, the magnetic circuit of the unidirectional flux generated by the direct current in the winding 20, indicated by the solid arrows, the solid dots and the X's surrounded by a single circle, includes two paths. The first of these paths is through the end region 17, the leg 16, the end region 18 and the leg 15 while the second is through the end region 17, the leg 13, the end region 18 and the leg 14. The magnetic circuit of the alternating flux, indicated by the broken arrows, the open dots and the X's surrounded by a double circle, generated as a result of the alternating current in the winding 19 also includes two paths; a first path through the end region 17, the leg 14, the end region 18 and the leg 15, and a second path through the end region 17, the leg 13, the end region 18 and the leg 16.

Of course, in each of the legs or common regions, there is only one flux having alternating and unidirectional components. However, for purposes of clarity in discussing the invention, these flux components will sometimes in this specification be referred to simply as fluxes. As can be seen, on the first half cycle of the alternating current, the unidirectional flux component and the alternating flux component are in additive relationship in the legs 13 and 15 but are in opposing relationship in the legs 14 and 16. Consequently, the permeability of the legs 14 and 16 is much greater than the permeability in the legs 13 and 15 and the reluctance in the legs 14 and 16 is lower than the reluctance in the legs 13 and 15. Of course, on the second half cycle of the alternating current, the flux components will be in opposition in the legs 13 and 15 and adding in the legs 14 and 16. On either half cycle, however, each alternating flux path will contain one additive leg and one subtractive leg. As the result of the additive flux components in the leg 15 and the subtractive flux components in the leg 14, the average permeability of the first path followed by the alternating flux is reduced and consequently the average inductance of the winding 19 is reduced. The average permeability of the second path followed by the alternating flux is also reduced because this path also includes one common region in which the flux components are in opposition and a second common region in which they are in additive relationship. The average permeability of each path followed by the alternating flux is thus reduced and consequently the average inductance of the winding 19 is reduced. The core is preferably made symmetrical so that its operation will be identical on each half cycle of the alternating current.

Figure 2:
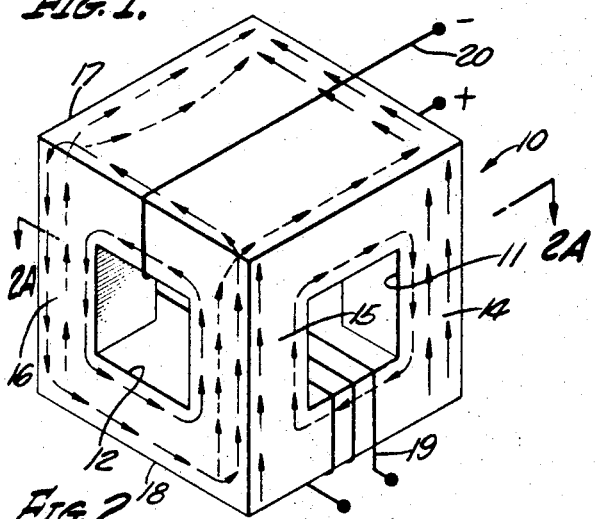
Figure 2A:
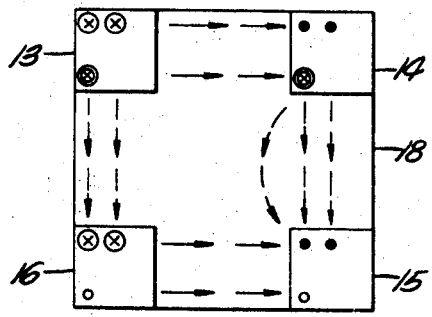

In FIGURES 2 and 2A, the direct current applied to the winding 20 has been increased with the result that more unidirectional flux is generated in the core. As a result of this increase in unidirectional flux, the legs 15 and 13 have an even lower permeability than was the case in FIGURE 1 and their reluctances are correspondingly higher. Some of the alternating flux passing from the leg 14 to the leg 15 may seek out paths of lesser reluctance and thus all of it may not follow a relatively straight line from the leg 14 to the leg 15 but rather some will "fringe" out to the central portion of the end region 18. Other known but not completely understood phenomena of magnetic circuits such as the availability and magnetizability of magnetic domains will also contribute to this fringing effect. Since the flux which fringes out in this manner will cut the winding 20 in equal magnitudes but opposite directions, only a very small effective flux linkage is present between the winding 19 and the winding 20 and good isolation is maintained between them.

Figure 3:
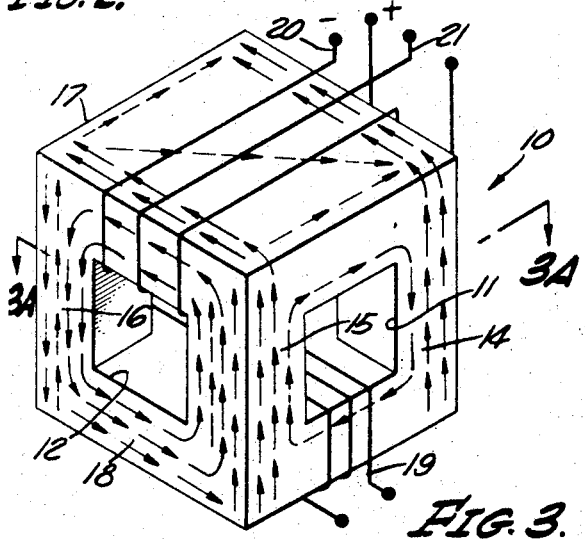
Figure 3A:
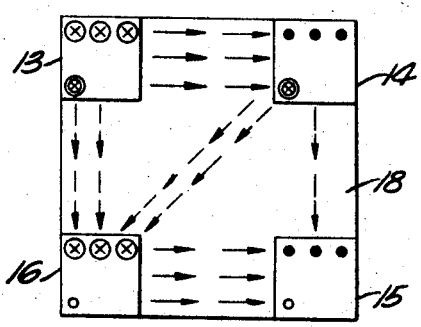

In FIGURES 3 and 3A, a third winding 21 has been wound around the end region 17 through the opening 12 so that its axis is parallel to the axis of the winding 20. This winding 21 acts as a secondary winding with the result that the device now serves as a variable transformer as a result of the varying inductance phenomena discussed above. As pointed out above, as the unidirectional flux in the core increases, the reluctance of the legs 13 and 15 get higher and higher and their permeability gets lower and lower. As pointed out above, the reluctance of a magnetic circuit is dependent both on its length and on its permeability. As the permeability of the leg 15 gets lower and lower, the reluctance of the magnetic path between the leg 14 and the leg 16 becomes less than the reluctance of the magnetic path between the leg 14 and the leg 15. Consequently, some of the flux leaving the leg 15 crosses over the end portion 18 and passes into the low reluctance region of the leg 16.

This crossover flux cuts the winding 21 with the result that a voltage is induced therein. The crossover flux also cuts the winding 20 and induces a voltage in the winding; however, this voltage can be essentially eliminated by use of a suitable choke. It should be understood that there is no particular point in which the flux from the leg 14 crosses over to the leg 16 instead of going to the leg 15 but that rather this is a gradual process with more and more flux crossing over as the reluctance of the leg 15 gets higher and higher and that of leg 16 gets lower and lower. As previously pointed out, however, it appears that the greatest amount of energy transfer is due to the varying inductance phenomena and only to a limited degree to the action of the crossover flux.

It should be understood that if desired the functions of the control winding 20 and the secondary winding 21 can be combined in a single winding to which is applied a DC bias or control signal and from which the output is taken.

FIGURES 4 and 4A illustrate the operation of the device in the non-frequency doubling mode. In these figures, a primary bias winding 22 has been wound through the opening 11 and acts to generate a unidirectional flux in the paths followed by the alternating flux. If the level of the bias flux generated by the winding 22, indicated by the dotted arrows, the double X's and the double circles, is maintained higher than the maximum value the alternating flux attains, the inductance of the secondary winding is only maximized once each cycle with the result that no frequency doubling occurs.

Looking at FIGURES 4 and 4A from the crossover flux standpoint, it can be seen that the legs 14 and 16 will always be the low reluctance legs and consequently the crossover flux will always follow the path shown with the result that the voltage induced in secondary winding 21 will have the same frequency as the input to primary winding 19 as explained previously.

It may be helpful at this point to turn to FIGURES 5A, 5B, 5C and 5D to further an understanding of the principles of operation of the present invention. When no control or DC current flows in the winding 20, all of the magnetic legs 13, 14, 15 and 16 are unbiased from a magnetic standpoint and each leg operates at substantially the same point on its associated hysteresis loop since the magnetic flux in each leg is essentially identical in magnitude for all values of load current, i.e., the current through the winding 19, the only difference being that two legs will be operating on the negative portion of their hysteresis loops while the other two legs are operating on the positive portion of their loops. Therefore, in the practical case where the load current is supplied from an alternating current source, the locus of the operating points associated with each leg will be essentially identical and will trace out a pattern similar to that shown in FIGURE 5A for a complete cycle of load current. This curve is what is normally referred to as a normal operating hysteresis loop. In this case the load current will see a near maximum average inductance over the entire cycle because there is no magnetic biasing in any of the legs and thus each leg has its maximum or near maximum permeability. Each of these curves can be experimentally verified by means of hysteresisograph waveforms viewed upon an oscilloscope.

Let it now be assumed that a direct current is passed through the winding 20 with the result that a magnetic bias is established in each leg. This bias is indicated by the vertical dotted lines in FIGURES 5B and 5C. The hysteresis curve associated with the additive legs 13 and 15 is now similar to that shown in FIGURE 5B while the hysteresis curve associated with the subtractive legs 14 and 16 is similar to that shown in FIGURE 5C. As can be seen from these figures, each of these hysteresis curves makes its swing around the bias level. The composite hysteresis loop associated with the legs 14 and 15, that is, with the first path followed by the alternating flux is similar to that shown in FIGURE 5D. This hysteresis loop is made up primarily of the left side of the curve of FIGURE 5B and the right side of the curve of FIGURE 5C with the bias level set by the control current acting as the midpoint of the curve in each part of the curve.

The shape of the curve in FIGURE 5D will be effected mainly by the leg having the highest permeability at any given time. This, is of course, only completely true if the permeability of one of the legs is very high compared to the other and thus becomes more the case for the load winding as the control current magnitude is increased to a high value. Because of the symmetry of the core in the preferred case, the average permeability of the material associated with leg 14 will be higher than that of leg 15 during one half of the cycle of the load current, and vice versa during the other half cycle. This symmetry, in conjunction with the operation of the leg paths causes the hysteresis loop of FIGURE 5D to have its different characteristic shape and results in the load current seeing an average inductance over its cycle that is less than it saw when there was no control current. This is evident as the hysteresis loop of FIGURE 5D has effectively rotated somewhat clockwise as compared to the hysteresis loop of FIGURE 5A. A larger H on the average is now required for a specific value of B as the hysteresis loop effectively rotates clockwise.

As the control current is still further increased, the hysteresis loop is effectively rotated further and further clockwise until it is essentially horizontal. This indicates that the average permeability associated with the material linked by the load winding is very low compared to the no control current condition and, of course, in this case the variable inductance has a very low average inductance. This is the "saturated" condition of the inductor of the present invention since additional control current will cause a relatively small change in the average inductance that the load current will see over its cycle of operation.

A typical plot of the inductance of the load winding as a function of the control current is shown in FIGURE 6. As will be evident from the figure and from the previous discussion, the polarity of the control current is unimportant to the control of the device.

FIGURES 7, 8 and 9 illustrate other core structures that could be used for either the variable inductor or the variable transformer of the present invention. As shown, they illustrate variable inductors; however, it will be obvious that a secondary winding could be added to convert their operation to that of a variable transformer as explained above. In FIGURE 7, a pair of C cores 25 and 26 are rotated 90° from each other and their bases joined together. The base of each C core 25 and 26 is preferably lapped very smooth so that the junctions of the cores are as perfect as possible and the presence of any air gap is minimized. A first winding 27 is wound on the core 25 while a second winding 28 is wound on the core 26. The common regions which the fluxes generated by both of the coils 27 and 28 traverse are shown generally at 29, 30 and 31. The fourth common region is, of course, at the other, hidden, junction of the cores 25 and 26. This then is a case where the "legs" have no structurally definable existence but in which they nevertheless have operative existence. The windings 27 and 28 are shown with their axes at right angles. This is preferable but not essential as the required flux paths will still be set up in the cores even if the coils are not at right angles. However, when the coils are not at right angles, the coupling between them is increased and thus the isolation of each coil from the other is not maximized.

The core of FIGURE 8 is very similar to that of FIGURES 1 through 4 and is constructed by forming slots 32 in C cores 33 and 34 similar to the cores 25 and 26 of FIGURE 7. The bases of the cores 33 and 34 are then lapped and joined together to form a structure with four legs or common regions 35, 36, 37 and 38. A winding 39 is wound on the core 33 and a winding 40 is wound on the core 34, preferably with their axes at right angles but not necessarily.

FIGURE 9 shows a tubular ferromagnetic core 41 having an axial passageway 42 and a pair of oppositely disposed radial slots 43 and 44. A first winding 45 is wound through the axial passageway 42 while a second winding 46 is wound through the slots 43 and 44. The fluxes generated by these two windings will have common regions at 47 and 48 and the similar areas on the opposite side of the core.

Turning now to FIGURE 10, one basic form of the invention as applied to a variable transformer is shown diagrammatically to include a core 50 which comprises a block of ferromagnetic material in which are formed transverse openings 51 and 52. There should be as little ferromagnetic material as possible between the openings 51 and 52 and preferably, they may partially or wholly intersect. If there is too great a spacing between these openings for the particular ferromagnetic material used, the fluxes present in the core will have low reluctance paths available to them which do not include the common regions which are necessary for the operation of the present invention. The opening should therefore be arranged so that substantially all of the flux generated will have to pass through these common regions.

A primary winding 53 is passed through the opening 51 and a seconding winding 54 is passed through the opening 52 so that the axes of these coils are preferably at right angles for the reasons previously given. An intermediate or control winding 55 is also passed through the opening 52 with its axis parallel to the axis of the secondary winding 54. If desired, a bias winding 56 can be passed through the opening 51 with its axis parallel to the axis of the primary winding 53. The bias winding 56 could be replaced by a permanent magnet if desired but the bias winding is preferably employed to provide independent control of the primary field. The bias winding could also be eliminated by applying the bias signal directly to the primary winding. When there is no primary bias, or when the primary bias is insufficient to prevent the primary signal from going negative, the transformer operates in the frequency doubling mode. When the primary bias winding carries a current sufficient to maintain the primary flux unidirectional under the effect of an alternating current input to the primary winding 53, the transformer operates in the non-frequency doubling mode. The reasons for these phenomena have been explained above.

Figure 12:
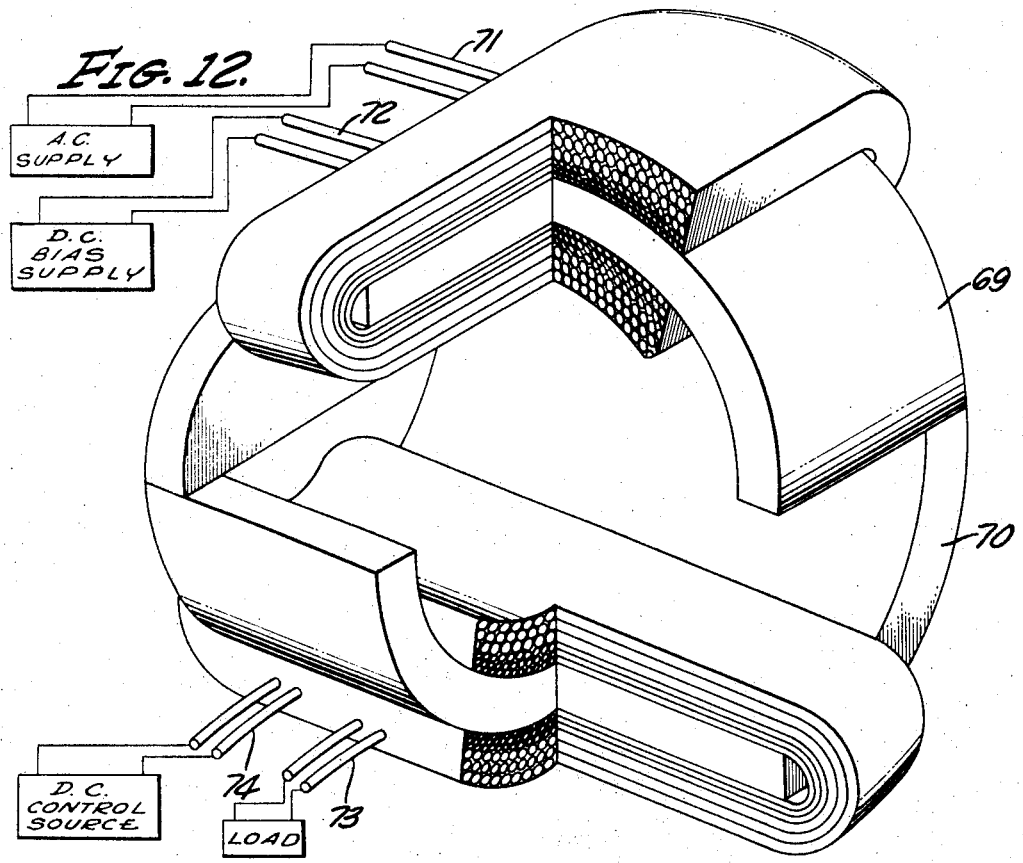
FIGURE 12 shows a seventh embodiment of the present invention.

A second specific embodiment of the transformer of the present invention is shown in FIGURE 11. This embodiment comprises two C cores 60 and 61 separated by a plate 62 and aligned in transversed directions. A primary winding 64 and a primary bias winding 65 are wound around core 60 and a secondary winding 66 and an intermediate or control winding 67 are wound around the core 61. Bias winding 65 and intermediate or control winding 67 can be formed from many turns of relatively small wire since no appreciable power is drawn from the bias or control source, but the primary winding 64 and the secondary winding 66 will usually be formed from relatively large wire to reduce the resistance losses in transferring energy from the primary to the secondary windings. Cores 60, 61 and plate 62 are preferably machined to fit together with high precision to minimize any air gap therebetween so as to provide a low reluctance magnetic circuit for the fluxes. As pointed out in connection with FIGURE 10, the substantial majority of the fluxes generated by the two windings must be caused to traverse the common regions in the core. Therefore, the thickness of the plate 62 must be kept thin with relation to the nature of the material from which it is made to prevent the formation of a relatively low reluctance path which will enable the fluxes to bypass the common regions. As will be obvious, the core structure of FIGURE 11 could also be provided without the central plate 62. Such a structure is shown in FIGURE 12 wherein two C cores 69 and 70 are directly positioned together. As was the case in FIGURE 11, a primary winding 71 and a primary bias winding 72 are wound around the core 69 while a secondary winding 73 and a control or intermediate winding 74 are wound around the core 70. As shown in FIGURE 12, the primary winding 71 is typically connected to an AC supply and the secondary winding 73 is connected to a load. The primary bias winding 72 is connected to a DC biased supply while the control or intermediate winding 74 is connected to a DC control source. As can be seen, this core structure is essentially similar to that shown in FIGURE 7 and illustrates that the same core structure can be used for either the variable inductor or variable transformer of the present invention.

Figure 13:
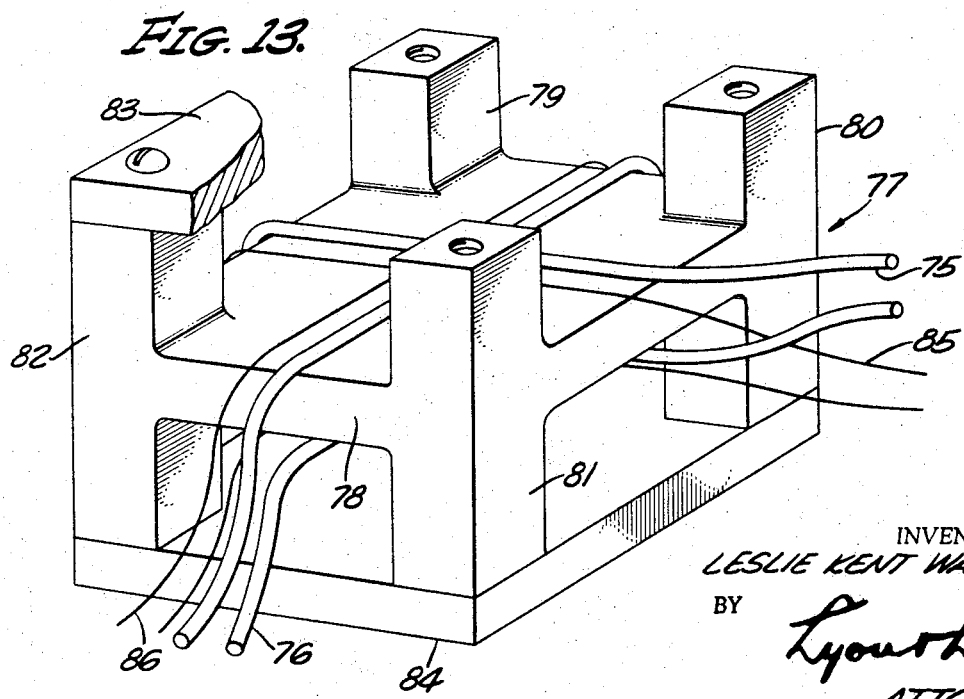
FIGURE 13 shows an eighth embodiment of the present invention.

FIGURE 13 illustrates a still further embodiment of a core that may be used in accordance with the present invention. In this figure, the primary winding 75 and the secondary winding 76 are wound about a common core 77 which is essentially composed of a flat plate 78 having corner posts 79, 80, 81 and 82 extending upwardly and downwardly therefrom to present an H shaped appearance from each side. Top and bottom plates 83 and 84 are fitted to respective sides of the common core 77, being preferably precision fitted at the joints to provide low reluctance paths. Primary bias winding 85 is wound parallel to the primary winding 75 and control or intermediate winding 86 is wound parallel to the secondary winding 76. In this embodiment, the flat plate 78 is made relatively thick so that it presents a low reluctance path to the fluxes generated by the windings and essentially magnetically isolates the upper portion of the core from the lower portion of the core. The upper portion of the core therefore presents a mirror image to the lower portion of the core with the fluxes generated by the windings dividing between the two portions. In this manner, the capacity of the core is increased while the core is kept smaller and more compact than would be possible with two separate cores.

Turning now to FIGURE 14, there is shown circuitry for utilizing the variable inductor of the present invention for controlling current flow to a load. The use of a core constructed in accordance with the present invention and its associated windings is indicated on this figure and in the succeeding figures by the use of a T shaped iron core symbol. The variable inductor 89 has its load winding 90 connected in series with an AC power supply 91 and a suitable load 92. A control winding 93 wound on the core is connected across a potentiometer 94 connected across the output of a DC power supply. By changing the setting of the potentiometer wiper arm, the DC current flowing in the winding 93 can be varied with an accompanying variation in the inductance of the winding 90 with the result that the current flowing through the load 92 can be electrically controlled in the manner previously set forth. It should be understood, of course, that the potentiometer shown is merely representative of the various ways in which the DC control current can be varied.

FIGURE 15 illustrates a refinement to the circuit of FIGURE 14 which is particularly useful in dynamically controlling illumination in response to electrically sensed music or other signals. In this figure, the load winding 95 of a variable inductor 96 of the present invention is connected in a series circuit with an AC power supply 97 and a load 98 which may take the form of one or more lamps. The control winding 99 of the variable inductor 96 is connected to a source of signals 100, for example, a source of electrical signals corresponding to music, through a rectifier 101 and an integrating circuit 102. As can be seen, the signals produced by the source 100 are rectified and integrated and applied to the winding 99 so that a unidirectional flux having a level varying in response to the signals produced by the source 100 is produced in the core. This results in a corresponding change in the inductance of the winding 95 so that the voltage appearing across the load 98 and the illumination produced by the lamps is in time with the music or other signals.

FIGURE 16 shows an AC voltage regulator utilizing a variable inductor of the present invention. In this figure, the load winding 171 of a variable inductor 170 is connected in series with the primary 172 of a conventional transformer 173 across an AC input. The secondary winding 174 of the transformer 173 is connected to output terminals 175. A sensing circuit 176 is connected across the output terminals 175 and feeds a first input of a comparison circuit 177, the other input of which is fed by a reference supply 178. The output of the comparison circuit 177 is fed to an amplifier and bias circuit 179, the output of which appears across the control winding 180 of the inductor 170. If desired, an auxiliary DC supply 181 including a suitable rectifying circuit can also be connected across the output terminals 175 to supply a DC or battery voltage to the various individual components of the circuit.

In operation, the voltage appearing across the output terminals 175 is sampled by the sensing circuit 176 and compared to the reference supply 178 by the comparison circuit 177. Any error signal is amplified in the amplifier circuit 179 and applied to the control winding 180 of inductor 170. If the voltage appearing across the terminals 175 has decreased, the output of the comparison circuit will be such that the current flowing through the control winding 180 is increased whereby the impedance of the winding 171 is decreased and the voltage appearing across the primary 172 and accordingly across the secondary 174 of the transformer 173 is increased. If, on the other hand, the voltage across the terminals 175 increases, the comparison circuit will produce an output that will cause the current flowing through the winding 180 to decrease with the result that the impedance of the winding 171 is increased and the voltage drop across the primary 172 is decreased. The operation and details of such comparison circuits are well known to those skilled in the art. It should be understood that if desired the transformer 173 can be eliminated and the winding 171 of inductor 170 connected directly between the AC input and the output terminals 175.

Figure 17:
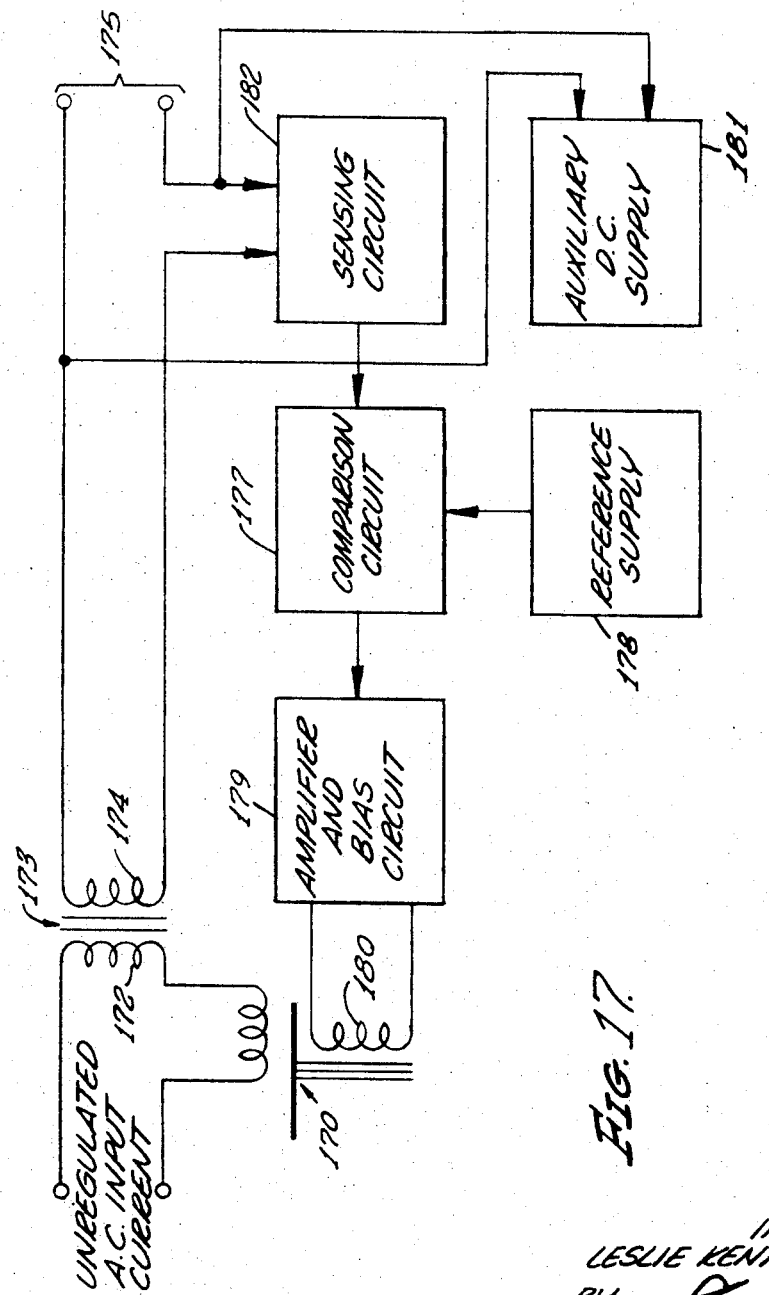
FIGURE 17 is a schematic diagram of an AC current regulator utilizing the variable inductor of the present invention.

FIGURE 17 shows an AC current regulator utilizing a variable inductor of the present invention. This circuit is similar in all respects to the voltage regulator circuit shown in FIGURE 16 with the exception that the sensing circuit 182 senses a change in output current rather than a change in output voltage. The other components of the circuit are identified by the same reference numerals as used in FIGURE 16. It is therefore not believed that an extensive discussion of the operation of the circuit is required.

Figure 18:
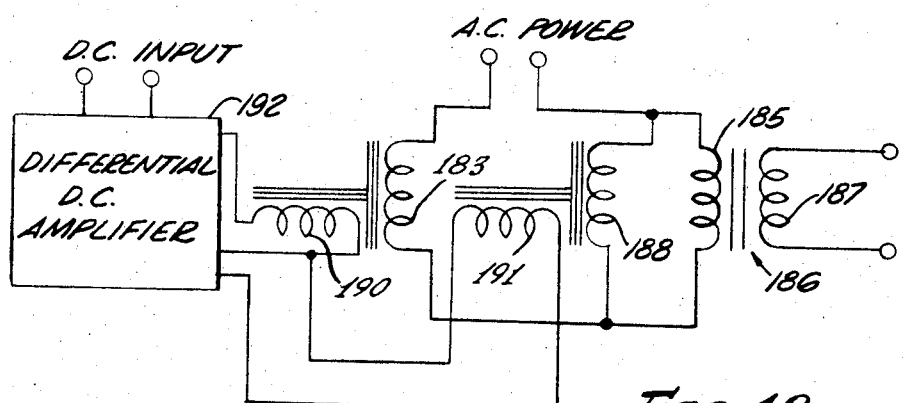
FIGURE 18 is a schematic diagram of a servo amplifier utilizing a pair of the variable inductors of the present invention.

FIGURE 18 illustrates a DC to AC amplifier which permits very good dynamic range of control of the AC output voltage. In the circuit, the load winding 183 of a variable inductor 184 is connected in series with the AC power input and the primary 185 of a conventional transformer 186 having a secondary winding 187 across which the output voltage is taken. The load winding 188 of a second variable inductor 189 is connected in shunt with the primary winding 185. The control winding 190 of the variable inductor 184 and the control winding 191 of the variable inductor 189 are coupled to the output of a differential DC amplifier 192. The DC signal to be amplified and converted to its AC equivalent is applied to the input of the DC amplifier 192.

In operation, when there is no input to the DC amplifier 192, its output will be balanced and the direct current flowing through the winding 190 will be the same as that flowing through the winding 191. Consequently, both of the variable inductors 184 and 189 will have the same unidirectional flux generated in their cores and the windings 183 and 188 will have the same impedance. When the DC amplifier 192 receives an input signal, the outputs become unbalanced and different currents flow through the windings 190 and 191 causing the inductance of one of the windings 183, 188 to increase and the inductance of the other of these windings to decrease. For example, the amplifier can be constructed such that a positive signal to its input will cause the current flowing in the winding 190 to be increased and the current flowing in the winding 191 to be decreased. Consequently, the series impedance in the line will be decreased and the shunt impedance will be increased with the result that a voltage will be developed across the primary winding 185 and hence the secondary winding 187.

Figure 19:
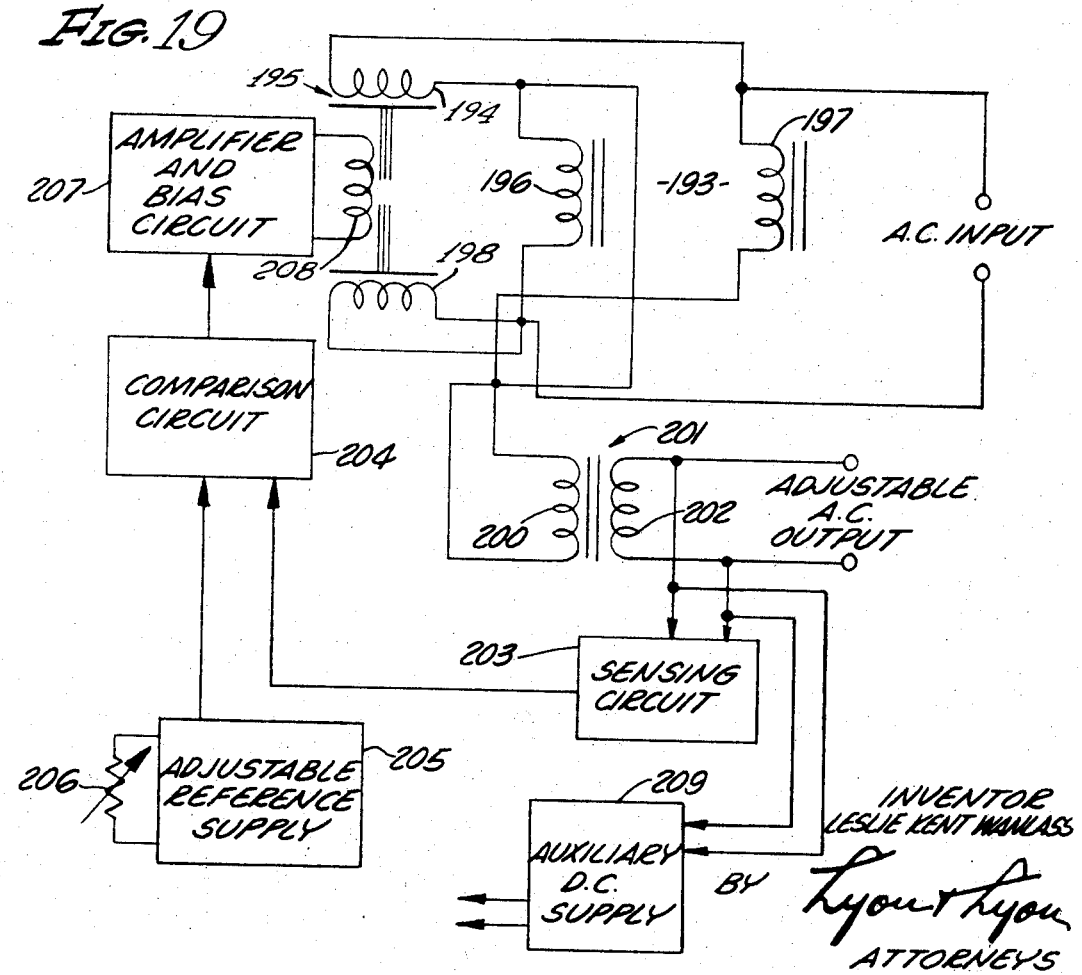
FIGURE 19 is a schematic diagram of a variable voltage supply utilizing a pair of the variable inductors of the present invention.

FIGURE 19 shows a circuit for supplying a variable level regulated AC voltage. In this figure, an unregulated AC input voltage is applied to a bridge circuit 193 having one arm including the load winding 194 of a variable inductor 195 and a conventional fixed inductor 196 and a second arm comprising a conventional fixed inductor 197 and the load winding 198 of a variable inductor 199. An output is taken between the junction of the winding 194 and the inductor 196 and the junction of the inductor 197 and the winding 198 and applied to the primary winding 200 of a conventional transformer 201. The secondary winding 202 of the transformer 201 provides the output voltage and has a sensing circuit 203 connected thereacross. The sensing circuit 203 produces a signal indicative of the voltage developed across the secondary winding 202 and feeds it to one input of a comparison circuit 204. The other input of the comparison circuit 204 is supplied by the output of an adjustable reference supply 205, the output of which may be varied, for example, by varying the setting of an adjustable resistor 206.

The comparison circuit 204 produces an output corresponding to the difference between the output of the sensing circuit 203 and the reference supply 205 and feeds it to an amplifier and bias circuit 207. The output of the amplifier and the bias circuit 207 is connected to a winding 208 which serves as the control winding for both of the variable inductors 195 and 199. If desired, of course, separate windings could be provided for this purpose.

In operation, if the sensing circuit 203 detects a change in the output voltage developed across the secondary 202, the output of the comparison circuit 204 is correspondingly changed, decreasing if the output voltage has decreased and increasing if the output voltage has increased. When the output of the comparison circuit 204 increases, the output of the amplifier and bias circuit 207 also increases and a larger DC current passes through the winding 208. In the manner explained above, this increased DC current in the control windings of the inductors 195 and 199 causes the inductance of their load windings 194 and 198 to decrease. A decrease in the inductance of the winding 198 results in a drop in voltage at the junction between this winding and the inductor 197, while a decrease in the inductance of the winding 194 causes a rise in voltage at the junction between this winding and the inductor 196 with the result that the voltage applied across the primary 200 is decreased and the output voltage is driven back towards the desired value. When the inductance of the windings 194 and 198 is increased, the output voltage of the bridge is increased toward the desired value. This desired value can be set from zero to the maximum value of the AC input voltage by adjusting the output level of the reference supply 205.

FIGURE 20 shows a circuit wherein the variable transformer of the present invention can be operated either in its doubling or non-doubling mode of operation. In this circuit, the control voltage and the primary bias voltage are derived from the input signal to the primary winding 235 of a variable transformer 236 by a half wave rectifier 237, the output of which is filtered in a pi section filter comprising resistor 238 and filter capacitors 239 and 240. Two potentiometers 241 and 242 are connected in parallel to the output of the rectifier circuit, the wiper arm of potentiometer 241 being applied to a bias winding 243, and the wiper arm of potentiometer 242 being applied to the control winding 244 of the variable transformer 236. The output is taken from the secondary winding 245. With this circuit, the initial strengths of the primary and control fluxes can be adjusted to any desired level between zero and maximum whereby the circuit can be operated in a doubling or non-doubling mode of operation as described above. In this particular circuit the adjustments of potentiometers 241 and 242 affect each other, so that it would be preferable first to adjust potentiometer 241 to give the desired mode of operation, and then to adjust potentiometer 242 to give the desired output amplitude. The adjustment of potentiometer 242 will change the voltage drop across potentiometer 241 but this will be of no practical effect since the size of the bias flux is not critical as long as the bias flux magnitude is sufficient to prevent reversal of primary flux in the non-doubling mode of operation.

FIGURES 21A, 21B and 21C show schematically various cores in which the windings are arranged such that their axes are not transverse. The positioning of the various legs or common regions in these figures is believed to be obvious and not to warrant extended discussion. Of course, the winding may also be wound non-transversely on the other cores illustrated if such is desired.

When reference is made in the claims to "the magnetic circuit" encompassed by a winding being non-saturated this is not intended to imply that all portions of the core remain non-saturated. Further, the term "average inductance" has been used interchangeably with and to mean the same as "effective inductance."

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. An electrical energy translating device comprising: a magnetic core having four common regions and two end regions magnetically joining said common region; first means including a first winding for continuously generating alternating magnetic flux in said core, said flux generated by said first means following a first path in said core through the first of said end regions, the first of said common regions, the second of said end regions and the fourth of said common regions and a second path in said core through said first end region, the second of said common regions, said second end region and the third of said common regions; second means including a second winding for continuously generating magnetic flux in said core, said flux generated by said second means following a third path in said core through said first end region, said first common region, said second end region and said second common region and a fourth path in said core through said first end region, said third common region, said second end region and said fourth common region; said fluxes being in opposing relationship in a first pair of said common regions and an additive relationship in the remaining pair of common regions such that each of said first and second paths include one opposing common region and one additive common region.

2. The device of claim 1 wherein each of said third and fourth paths includes one opposing common region and one additive common region.

3. The electrical energy translating device of claim 1 wherein said first said means for generating magnetic flux further comprises first means for continually supplying current to said first winding and wherein said second means for generating magnetic flux further comprises second means for continually supplying current to said second winding.

4. The electrical energy translating device of claim 3 wherein said first winding is wound between said first and fourth common regions and between said second and third common regions and wherein said second winding is wound between said first and second common regions and between said third and fourth common regions.

5. The device of claim 3 wherein said core comprises a block of ferromagnetic material having first and second transverse openings formed therein, said first winding being wound through said first opening and said second winding being wound through second opening.

6. The device of claim 5 wherein said first and second openings intersect.

7. The device of claim 3 wherein said core comprises first and second C cores, said first C core being rotated approximately 90° with relation to said second C core and the bases thereof being connected together, said first winding being wound on one of said C cores and said second winding being wound on the other of said C cores.

8. The device of claim 3 wherein said magnetic core comprises a tube of ferromagentic material having an axial opening therein and first and second radial slots formed in the walls thereof, said first winding being wound through said axial opening and said second winding being wound through said radial slots.

9. The device of claim 3 wherein a load is provided, said first winding being connected in circuit with said load and said first means for supplying current.

10. The device of claim 1 wherein means are provided for producing a voltage in response to changes in permeability of said first and second flux paths as a result of the magnitude of the flux generated by said second means.

11. The device of claim 4 wherein a third winding is wound on said core, said third winding intersecting said third and fourth paths.

12. The device of claim 11 wherein a load is provided, said third winding being connected in circuit with said load.

13. The device of claim 11 wherein a fourth winding is wound on said core, said fourth winding intersecting said first and second paths, and wherein means are provided for applying a direct current to said fourth winding.

14. An electrical energy translating device comprising a magnetic core having four legs and first and second portions joining said four legs; a first winding wound on said core; means for continually applying an alternating electrical input to said first winding to generate a continuous alternating magnetic flux in said core; said alternating flux following a first path through said first portion, the first of said legs, said second portion and fourth of said legs and a second path through said first portion, the second of said legs, said second portion and the third of said legs; a second winding wound on said core; means for continually applying a control signal to said second winding to create a second continuous magnetic flux in said core, said second flux following a third path through said first portion, said first leg, said second portion and said second leg and a fourth path through said first portion, said fourth leg, said second portion and said third leg.

15. The device of claim 14 wherein said core comprises first and second C cores, said first C core being second transverse openings formed therein, said first winding being wound through said first opening and said second winding being wound through second opening.

16. The device of claim 15 wherein said first and second openings intersect.

17. The device of claim 14 wherein said core comprises first and second C cores, said first C core being rotated approximately 90° with relation to said second C core and the bases thereof being connected together, said first winding being wound on one of said C cores and said second winding being wound on the other of said C cores.

18. The device of claim 14 wherein said magnetic core comprises a tube of ferromagnetic material having an axial opening therein and first and second radial slots formed in the walls thereof, said first winding being wound through said axial opening and said second winding being wound through said radial slots.

19. The device of claim 14 wherein said second winding is coupled to an adjustable direct current source whereby said second flux is unidirectional, the effective inductance of said first winding being controlled by the magnitude of said direct current.

20. The device of claim 14 wherein a load is provided, said first winding being connected in series with said load and said means for applying an alternating electrical input.

21. The device of claim 14 wherein a third winding is provided for producing a voltage in response to variations in the reluctances of said legs as a result of the magnitude of the magnetic flux generated by said second winding.

22. An electrical energy translating device comprising a magnetic core having four legs and first and second portions joining said four legs; a first winding wound on said core; means for continuously applying an alternating electrical input to said first winding to generate a continuous alternating magnetic flux in said core; said alternating flux following a first path through said first portion, a first of said legs, said second portion and a fourth of said legs and a second path through said first portion, a second of said legs, said second portion and a third of said legs; a second winding wound on said core; means for continuously applying a control signal to said second winding to create a continuous unidirectional magnetic flux in said core; said unidirectional flux following a third path through said first portion, said first leg, said second portion and said second leg and a fourth path through said first portion, said fourth leg, said second portion and said third leg.

23. The device of claim 22 wherein the axis of said first and second windings are transverse.

24. The device of claim 22 wherein said core comprises a block of ferromagnetic material having first and second transverse openings formed therein, said first winding being wound through said first opening and said second winding being wound through second opening.

25. The device of claim 24 wherein said first and second openings intersect.

26. The device of claim 22 wherein said core comprises first and second C cores, said first C core being rotated approximately 90° with relation to said second C core and the bases thereof being connected together, said first winding being wound on one of said C cores and said second winding being wound on the other of said C cores.

27. The device of claim 22 wherein said magnetic core comprises a tube of ferromagnetic material having an axial opening therein and first and second radial slots formed in the walls thereof, said first winding being wound through said axial opening and said second winding being wound through said radial slots.

28. The device of claim 22 wherein a load is provided, said first winding being connected in circuit with said load and with said means for applying an alternating electrical input.

29. The device of claim 22 wherein a third winding is wound on said core, said third winding intersecting said third and fourth flux paths.

30. The device of claim 29 wherein means are provided for establishing a second unidirectional flux in said core, said second unidirectional flux following said first and second paths.

31. The device of claim 29 wherein the axis of said first and second windings are transverse and the axis of said third winding is parallel to the axis of said second winding.

32. An electrical energy translating device comprising a ferromagnetic core having four symmetrical legs and first and second portions joining said four legs; a first winding wound on said core; means for continuously applying an alternating electrical input to said first winding to create a continuous alternating magnetic flux in said core, said alternating flux following a first path through said first portion, said first leg, said second portion and said fourth leg and a second path through said first portion, said second leg, said second portion and said third portion leg; a second winding wound on said core; means for continuously applying a control signal to said second winding to create a continuous unidirectional magnetic flux in said core, said unidirectional flux following a third path through said first portion, said first leg, said second portion and said second leg and a fourth path through said first portion, said fourth leg, said second portion and said third leg; said fluxes being in opposing relationship in two of said common regions whereby the reluctance of said common regions is reduced, and in additive relationship in the other two of said common regions whereby the reluctance of said other two common regions is increased; each of said first and second paths including one opposing flux common region and one additive flux common region, the magnitudes of said fluxes being such that said first and second paths remain in the non-saturated regions of their magnetization curves during at least a portion of each cycle of said alternating input.

33. The device of claim 32 wherein a load is provided, said first winding being connected in circuit with said load and said means for applying an alternating electrical input.

34. The device of claim 32 wherein a third winding is wound on said core intersecting said third and fourth flux paths, said third winding producing a voltage in response to interaction of said first and second fluxes.

35. The device of claim 34 wherein the axis of said first and second windings are transverse and the axis of said third winding is parallel to the axis of said second winding.

36. The device of claim 34 wherein means are provided for establishing a unidirectional flux in said core, said unidirectional flux following said first and second paths.

37. An electrical energy translating device comprising a ferromagnetic core having four common regions and first and second portions joining said common regions, said core comprising first and second C cores, said first C core being rotated approximately 90° with relation to said second C core and the bases thereof being connected together; a first winding wound on one of said C cores with its axis extending between said first and second common regions and between said third and fourth common regions; a second winding wound on the other of said C cores with its axis extending between said first and fourth common regions and between said second and third common regions; means for continuously applying an alternating current to said first winding whereby continuous alternating magnetic flux is generated in said core; means for continuously applying a control current to said second winding whereby a continuous control flux is generated in said core; said control flux being of a magnitude sufficient to maintain the magnetic circuit encompassed by said first winding in a substantially non-saturated condition during at least a portion of each cycle of said alternating current.

38. An electrical energy translating device comprising a ferromagnetic core having four common regions and first and second regions joining said four common regions, said core comprising a tube of ferromagnetic material having an axial opening therein and first and second radial slots formed in the walls thereof; a first winding wound on said core through said axial opening with its axis extending between said first and second common regions and between said third and fourth common regions; a second winding wound on said core through said radial slots with its axis extending between said first and fourth common regions and between said second and third common regions; means for continuously applying an alternating current to said first winding whereby a continuous alternating magnetic flux is generated in said core; means for continuously applying a direct current to said second winding whereby a continuous unidirectional flux is generated in said core; said unidirectional flux being of a magnitude sufficient to normally maintain the magnetic circuit encompassed by said first winding in a non-saturated condition during at least a portion of each cycle of said alternating current.

39. An electromagnetic device comprising first and second C cores of ferromagnetic material, said first C core being rotated approximately 90° with relation to said second C core and the bases thereof being connected together at the four corners of each C core; a first winding wound about said first C core; and a second winding wound about said second C core.

40. A variable inductance device comprising a magnetic core having four common regions and two end regions magnetically joining said common regions; a load winding wound on said core between the first and the fourth and the second and the third of said common regions; a control winding wound on said core between said first and second and said third and fourth common regions substantially transverse to said load winding; means for continuously supplying an alternating current to said load winding; and means for continuously supplying a control current to said control winding, variations in said control current causing variations in the inductance of said load winding without substantially distorting the waveform of said alternating current.

41. A variable inductance device comprising a magnetic core having four common regions and two end regions magnetically joining said common regions, a load winding wound on said core and encompassing a magnetic circuit therein, means for supplying a continuous alternating current to said load winding, control winding means wound on said core substantially transverse to said load winding, and means for continuously supplying current to said control winding means, said control winding means being responsive to change in current therein to effectively rotate the hysteresis loop of said magnetic circuit and thereby vary the inductance of said winding without substantially distorting the waveform of said alternating current.

42. A variable inductance device comprising a magnetic core having four common regions and two end regions magnetically joining said common regions, a load winding wound on said core and encompassing a magnetic circuit therein, the effective reluctance of said magnetic circuit controlling the inductance of said load winding, means for supplying a continuous alternating circuit to said load winding, control winding means wound on said core substantially transverse to said load winding, and means for continuously supplying current to said control winding means, said control winding means being responsive to current therein for generating magnetic flux in said core, said magnetic flux controlling said effective reluctance of said magnetic circuit whereby variations in said flux cause the hysteresis loop of said magnetic circuit to effectively rotate thereby varying the inductance of said load winding without substantially distorting the waveform of said alternating current.

43. A variable inductance device comprising a magnetic core having four common regions and two end regions magnetically joining said common regions, a load winding wound on said core and encompassing a first magnetic circuit therein, means for supplying a continuous alternating current to said load winding, control means wound on said core substantially transverse to said load winding, and means for supplying unidirectional current to said control winding means, said control winding means being responsive to current therein for generating a unidirectional flux in said core, said unidirectional flux encompassing a second magnetic circuit in said core, portions of said second magnetic circuit being common with portions of said first magnetic circuit in said common regions whereby variations of said unidirectional flux causes the hysteresis loop of said first magnetic circuit to effectively rotate and the inductance of said load winding to change without substantially distorting the waveform of said alternating current.

44. A variable inductance device comprising a magnetic core having four common regions and two end regions magnetically joining said common regions, a load winding wound on said core and encompassing a magnetic circuit therein, means for supplying a continuous alternating current to said load winding, control winding means wound on said core substantially transverse to said load winding, said control winding means being responsive to changes in current therein to effectively rotate the hysteresis loop of said magnetic circuit and thereby vary the inductance of said load winding without substantially distorting the waveform of said alternating current, means coupled to said control winding means for supplying control current thereto, and means for varying the magnitude of said control current whereby said inductance of said load winding can be continuously varied.

45. A variable transformer comprising a magnetic core having four common regions and two end regions magnetically joining said common regions, a primary winding wound on said core between the first and fourth and the second and third of said common regions; means for continuously supplying alternating current to said primary winding; a secondary winding; a control winding; said secondary winding and said control winding being wound on said core between said first and second and said third and fourth common regions and substantially transverse to said primary winding whereby normally substantially no power is transferred from said primary winding to said secondary winding; and means for continuously supplying current to said control winding, said supplying of current causing power to be transferred from said primary winding to said secondary winding.

46. The transformer of claim 45 wherein said current supplied to said control winding is direct current and wherein means are provided for varying said direct current whereby said power transfer is varied.

47. A variable transformer comprising a magnetic core having four common regions and two end regions magnetically joining said common regions, a primary winding wound on said core between the first and fourth and the second and the third of said common regions and encompassing a magnetic circuit in said core; means for continuously supplying alternating current to said primary winding; a secondary winding; a control winding; said secondary winding and said control winding being wound on said core between said first and second and said third and fourth common regions and substantially transverse to said primary winding whereby normally there is substantially no power transferred from said primary winding to said secondary winding; and means for continuously supplying current to said control winding, said control winding being responsive to current therein for generating magnetic flux in said core, said flux controlling the effective reluctance of said magnetic circuit whereby increasing said flux causes an increased power transfer between said primary and secondary windings.

48. A system for controlling the current flow between an alternating current source and a load comprising: a magnetic core having four common regions and two end regions magnetically joining said common regions; a load winding wound on said core between the first and the fourth and the second and the third of said common regions, said load winding being connected in series with said source and said load; a control winding wound on said core between said first and second and said third and fourth common regions; a source of direct current; means for varying the magnitude of said direct current; and means connecting said direct current varying means to said control winding to supply a direct current thereto, variations in said direct current causing variations in the inductance of said load winding.

49. A system for controlling the current flow between an alternating current source and a load comprising: a ferromagnetic core having four common regions and first and second portions joining said four common regions; a first winding wound on said core with its axis extending between said first and second common regions and between said third and fourth common regions, said first winding being connected in series with said source and said load whereby an alternating current is passed through said first winding and an alternating magnetic flux is generated in said core; a second winding wound on said core with its axis extending between said first and fourth common regions and between said second and third common regions; a source of direct current; means for varying the magnitude of said direct current; means connecting said direct current varying means to said second winding for applying a direct current electrical signal thereto whereby a unidirectional flux is generated in said core, said unidirectional flux acting to maintain the magnetic circuit encompassed by said first winding in a non-saturated condition whereby the average permeability of said magnetic circuit and the average inductance of said first winding are dependent on the magnitude of said direct current.

50. A system for controlling the current flow between an alternating current source and a load comprising: a ferromagnetic core; a first winding wound on said core, said first winding being connected in series with said source and said load, current passing through said first winding generating an alternating magnetic flux in said core, said alternating flux following first and second paths in said core; a second winding wound on said core; means for supplying direct current to said second winding; means for varying the magnitude of said direct current; said direct current passing through said second winding generating a unidirectional magnetic flux in said core, said unidirectional flux following third and fourth paths in said core; said first path sharing a first common region in said core with said third path and a second common region in said core with said fourth path, said second path sharing a third common region in said core with said third path and a fourth common region in said core with said fourth path, said fluxes being in opposing relationship in two of said common regions whereby the reluctance of said common regions is reduced, and in additive relationship in the other two of said common regions whereby the reluctance of said other two common regions is increased, each of said first, second, third and fourth paths including one opposing flux common region and one additive flux common region whereby the average permeability of each of said first and second paths and the average inductance of said first winding are dependent on the magnitude of said direct current.

51. A system for controlling the current flow between an alternating current source and a load comprising: a ferromagnetic core having four symmetrical legs and first and second portions joining said four legs; a first winding wound on said core, said first winding being connected in series with said source and said load, current passing through said first winding generating an alternating magnetic flux in said core, said alternating flux following a first path through said first portion, said first leg, said second portion and said fourth leg, and a second path through said first portion, said second leg, said second portion and said third leg; a second winding wound on said core; means for supplying direct current to said second winding; means for varying the magnitude of said direct current; said direct current passing through said second winding generating a unidirectional magnetic flux in said core, said unidirectional flux following a third path through said first portion, said first leg, said second portion and said second leg and a fourth path through said first portion, said fourth leg, said second portion and said third leg; said fluxes being in opposing relationship in said first and third legs and in additive relationship in said second and fourth legs during the first half cycle of said alternating current, and in opposing relationship in said second and fourth legs and in additive relationship in said first and third legs during the second half cycle of said alternating current whereby on either half cycle of said alternating current each of said first and second paths includes one opposing flux leg and one additive flux leg whereby the average permeability of each of said first and second paths and the average inductance of said first winding is dependent on the magnitude of said direct current, the magnitude of said direct current being maintained such that said first and second paths remain in the non-saturated regions of their magnetization curves.

52. A system for controlling the current flow between an alternating current source and a load in response to the output of a source of signals comprising: a magnetic core having four common regions and two end regions magnetically joining said common regions; a load winding wound on said core, said load winding being connected in series with said source and said load, said load winding being wound between the first and the fourth and the second and the third of said common regions; a control winding wound on said core between said first and second and said third and fourth common regions; rectifying means; integrating means; means connecting said source of signals, said rectifying means and said integrating means in a series circuit with said control winding whereby a unidirectional current having a magnitude dependent on the output of said source of signals passes through said control winding, variations in said unidirectional current resulting from variations in the signals from said source causing variations in the inductance of said load winding.

53. A system for controlling the current flow between an alternating current source and a load in response to the output of a source of signals comprising: a ferromagnetic core having four common regions and first and second portions joining said four common regions, a first winding wound on said core with its axis extending between said first and second common regions and between said third and fourth common regions, said first winding being connected in series with said source and said load whereby an alternating current is passed through said first winding and an alternating magnetic flux is generated in said core; a second winding wound on said core with its axis extending between said first and fourth common regions and between said second and third common regions; rectifying means; integrating means; means connecting said source of signals, said rectifying means and said integrating means in a series circuit whereby a unidirectional current having a magnitude dependent on the output of said source of signals passes through said second winding thereby causing a unidirectional magnetic flux to be generated in said core, said unidirectional flux acting to maintain the magnetic circuit encompassed by said first winding in a non-saturated condition whereby the average permeability of said magnetic circuit and the average inductance of said first winding are dependent on the magnitude of said unidirectional current.

54. A system for controlling the current flow between an alternating current source and a load in response to the output of a source of signals comprising: a ferromagnetic core; a first winding wound on said core, said first winding being connected in series with said source and said load, current passing through said first winding generating an alternating magnetic flux in said core, said alternating flux following first and second paths in said core; a second winding wound on said core; rectifying means; integrating means; means connecting said source of signals, said rectifying means and said integrating means in a series circuit whereby a unidirectional current having a magnitude dependent on the output of said source of signals passes through said second winding; said unidirectional current passing through said second winding generating a unidirectional magnetic flux in said core, said unidirectional flux following third and fourth paths in said core; said first path sharing a first common region in said core with said third path and a second common region in said core with said fourth path, said second path sharing a third common region in said core with said third path and a fourth common region in said core with said fourth path, said fluxes being in opposing relationship in two of said common regions whereby the reluctance of said common regions is reduced, and in additive relationship in the other two of said common regions whereby the reluctance of said other two common regions is increased, each of said first, second, third and fourth paths including one opposing flux common region and one additive flux common region whereby the average permeability of each of said first and second paths and the effective inductance of said first winding are dependent on the magnitude of said unidirectional current.

55. A system for controlling the current flow between an alternating current source and a load in response to the output of a source of signals comprising: a ferromagnetic core having four symmetrical legs and first and second portions joining said four legs; a first winding wound on said core, said first winding being connected in series with said source and said load, current passing through said first winding generating an alternating magnetic flux in said core, said alternating flux following a first path through said first portion, said first leg, said second portion and said fourth leg, and a second path through said first portion, said second leg, said second portion and said third leg; a second winding wound on said core; rectifying means; integrating means; means connecting said source of signals, said rectifying means, said integrating means, and said second winding in a series circuit whereby a unidirectional current having a magnitude dependent upon the output of said source of signals passes through said second winding; said unidirectional current passing through said second winding generating a unidirectional magnetic flux in said core, said unidirectional flux following a third path through said first portion, said first leg, said second portion and said second leg and a fourth path through said first portion, said fourth leg, said second portion and said third leg; said fluxes being in opposing relationship in said first and third legs and in additive relationship in said second and fourth legs during the first half cycle of said alternating current, and in opposing relationship in said second and fourth legs and in additive relationship in said first and third legs during the second half cycle of said alternating current whereby on either half cycle of said alternating current each of said first and second paths include one opposing flux leg and one additive flux leg whereby the average permeability of each of said first and second paths and the average inductance of said first winding is dependent on the magnitude of said unidirectional current, the magnitude of said unidirectional current being maintained such that first and second paths remain in the non-saturated regions of their magnetization curves.

56. A system for producing a regulated AC voltage comprising: an unregulated AC voltage source; a pair of output terminals; a magnetic core having four common regions and two end regions magnetically joining said common regions; a load winding wound on said core between the first and the fourth and the second and the third of said common regions; means coupling said source of unregulated AC voltage to said output terminals, said coupling means including means connecting said load winding in series with said source of unregulated AC voltage; a control winding wound on said core between said first and second and said third and fourth common region; means for sensing the voltage across said output terminals; a reference voltage supply; means for comparing said sensed voltage with said reference voltage; means coupling said control winding to said comparing means whereby a direct current is passed through said control winding, the magnitude of said direct current increasing if said sensed voltage drops below said reference voltage and decreasing if said sensed voltage exceeds said reference voltage, variations in said direct current causing variations in the inductance of said load winding, the inductance of said load winding increasing if said direct current decreases and decreasing if said direct current increases.

57. A system for producing a regulated AC voltage comprising: an unregulated AC voltage source; a pair of output terminals; a ferromagnetic core having four common regions and first and second portions joining said four common regions; a first winding wound on said core with its axis extending between said first and second common regions and between said third and fourth common regions; means coupling said source of unregulated AC voltage to said output terminals; means connecting said first winding in series with said source of unregulated AC voltage whereby an alternating current is passed through said first winding and an alternating magnetic flux is generated in said core; a second winding wound on said core with its axis extending between said first and fourth common regions and between said second and third common regions; means for sensing the voltage across said output terminals; a reference voltage supply; means for comparing said sensed voltage with said reference voltage; means coupling said second winding to said comparing means whereby a direct current is passed through said second winding, the magnitude of said direct current increasing if said sensed voltage drops below said reference voltage and decreasing if said sensed voltage exceeds said reference voltage; said direct current passing through said second winding generating a unidirectional magnetic flux in said core, said unidirectional flux acting to maintain the magnetic circuit encompassed by said first winding in a partially non-saturated condition whereby the average permeability of said magnetic circuit and the effective inductance of said first winding are dependent on the magnitude of said direct current, the inductance of said first winding increasing if said direct current decreases and decreasing if said direct current increases.

58. A system for producing a regulated AC voltage comprising: an unregulated AC voltage source; a pair of output terminals; a ferromagnetic core; a first winding wound on said core; means coupling said source of unregulated AC voltage to said load; means connecting said first winding in series with said source of unregulated AC voltage whereby an alternating current is passed through said first winding and an alternating magnetic flux is generated in said core, said alternating flux following first and second paths in said core; a second winding wound on said core; means for sensing the voltage across said output terminals; a reference voltage supply; means for comparing said sensed voltage with said reference voltage; means coupling said second winding to said comparing means whereby a direct current is passed through said second winding, the magnitude of said direct current increasing if said sensed voltage drops below said reference voltage and decreasing if said sensed voltage exceeds said reference voltage; said direct current passing through said second winding generating a unidirectional magnetic flux in said core; said unidirectional flux following third and fourth paths in said core; said first path sharing a first common region in said core with said third path and a second common region in said core with said fourth path, said second path sharing a third common region in said core with said third path and fourth common region in said core with said fourth path, said fluxes being in opposing relationship in two of said common regions whereby the reluctance of said common regions is reduced, and in additive relationship in the other two of said common regions whereby the reluctance of said other two common regions is increased, each of said first, second, third and fourth paths including one opposing flux common region and one additive flux common region whereby the average permeability of each of said first and second paths and the effective inductance of said first winding are dependent on the magnitude of said direct current the inductance of said first winding increasing if said direct current decreases and decreasing if said direct current increases whereby the voltage across said output terminals is maintained at a desired value.

59. A system for producing a regulated AC voltage comprising: an unregulated AC voltage source; a pair of output terminals; a ferromagnetic core having four symmetrical legs and first and second portions joining said four legs; a first winding wound on said core; means coupling said source of unregulated AC voltage to said output terminals; means connecting said first winding in series with said source of unregulated AC voltage whereby an alternating current is passed through said first winding and an alternating magnetic flux is generated in said core, said alternating flux following a first path in said core through said first portion, said first leg, said second portion and said fourth leg, and a second path through said first portion, said second leg, said second portion and said third leg; a second winding wound on said core; means for sensing the voltage across said output terminals; a reference voltage supply; means for comparing said sensed voltage with said reference voltage; means coupling said second winding to said comparing means whereby a direct current is passed through said second winding, the magnitude of said direct current increasing if said sensed voltage drops below said reference voltage and decreasing if said sensed voltage exceeds said reference voltage; said direct current passing through said second winding generating a unidirectional magnetic flux in said core, said unidirectional flux following a third path through said first portion, said first leg, said second portion and said second leg and a fourth path through said first portion, said fourth leg, said second portion and said third leg; said fluxes being in opposing relationship in said first and third legs and in additive relationship in said second and fourth legs during the first half cycle of said alternating current, and in opposing relationship in said second and fourth legs and in additive relationship in said first and third legs during the second half cycle of said alternating current whereby on either half cycle of said alternating current each of said first and second paths includes one opposing flux leg and one additive flux leg whereby the average permeability of each of said first and second paths and the effective inductance of said first winding is dependent on the magnitude of said direct current, the inductance of said first winding increasing if the direct current decreases and decreasing if said direct current increases whereby the voltage appearing across said output terminals is maintained at a desired value.

60. A system for producing a regulated AC current comprising: an unregulated AC current source; an output circuit; a magnetic core having four common regions and two end regions magnetically joining said common regions; a load winding wound on said core between the first and the fourth and the second and the third of said common regions; means coupling said source of unregulated AC current to said output circuit, said coupling means including means connecting said load winding in series with said source of unregulated AC current; a control winding wound on said core between said first and second and said third and fourth common regions; means for sensing the current in said output circuit; reference means; means for comparing said sensed current with said reference means; means coupling said control winding to said comparing means whereby a direct current is passed through said control winding, the magnitude of said direct current increasing if said sensed current drops below said reference and decreasing if said sensed current exceeds said reference, variations in said direct current causing variations in the inductance of said load winding, the inductance of said load winding increasing if said direct current decreases and decreasing if said direct current increases.

61. A system for producing a regulated AC current comprising: an unregulated AC current source; an output circuit; a ferromagnetic core having four common regions and first and second portions joining said four common regions; a first winding wound on said core with its axis extending between said first and second common regions and between said third and fourth common regions; means coupling said source of unregulated AC current to said output circuit; means connecting said first winding in series with said source of unregulated AC current whereby an alternating current is passed through said first winding and an alternating magnetic flux is generated in said core; a second winding wound on said core with its axis extending between said first and fourth common regions and between said second and third common regions; means for sensing the current in said output circuit; reference means; means for comparing said sensed current with said reference means; means coupling said second winding to said comparing means whereby a direct current is passed through said second winding, the magnitude of said direct current increasing if said sensed current drops below said reference and decreasing if said sensed current exceeds said reference; said direct current passing through said second winding generating a unidirectional magnetic flux in said core, said unidirectional flux acting to maintain the magnetic circuit encompassed by said first winding in a non-saturated condition whereby the average permeability of said magnetic circuit and the effective inductance of said first winding are dependent on the magnitude of said direct current, the inductance of said first winding increasing if said direct current decreases and decreasing if said direct current increases.

62. A system for producing a regulated AC current comprising: an unregulated AC current source; an output circuit; a ferromagnetic core; a first winding wound on said core; means coupling said source of unregulated AC current to said output circuit; means connecting said first winding in series with said source of unregulated AC current whereby an alternating current is passed through said first winding and an alternating magnetic flux is generated in said core, said alternating flux following first and second paths in said core; a second winding wound on said core; means for sensing the current in said output circuit; reference means; means for comparing said sensing current with said reference means; means coupling said second winding to said comparing means whereby a direct current is passed through said second winding, the magnitude of said direct current increasing if said sensed current drops below said reference and decreasing if said current exceeds said reference; said direct current passing through said second winding generating a unidirectional magnetic flux in said core, said unidirectional flux following third and fourth paths in said core; said first path sharing a first common region in said core with said third path and a second common region in said core with said fourth path, said second path sharing a third common region in said core with said third path and a fourth common region in said core with said fourth path, said fluxes being in opposing relationship in two of said common regions whereby the reluctance of said common regions is reduced, and in additive relationship in the other two of said common regions whereby the reluctance of said other two common regions is increased, each of said first, second, third and fourth paths including one opposing flux common region and one additive flux common region whereby the average permeability of each of said first and second paths and the effective inductance of said first winding are dependent on the magnitude of said direct current, the inductance of said first winding increasing if said direct current decreases and decreasing if said direct current increases whereby the current in said output circuit is maintained at a desired value.

63. A system for producing a regulated AC current comprising: an unregulated AC current source; an output circuit; a ferromagnetic core having four symmetrical legs and first and second portions joining said four legs; a first winding wound on said core; means coupling said source of unregulated AC current to said output circuit; means connecting said first winding in series with said source of unregulated AC current whereby an alternating current is passed through said first winding and an alternating magnetic flux is generated in said core, said alternating flux following a first path in said core through said first portion, said first leg, said second portion and said fourth leg and a second path through said first portion, said second leg, said second portion and said third leg; a second winding wound on said core; means for sensing the current in said output circuit; a reference supply; means for comparing said sensed current with said reference; means coupling said second winding to said comparing means whereby a direct current is passed through said second winding, the magnitude of said direct current increasing if said sensed current drops below said reference and decreasing if said sensed current exceeds said reference; said direct current passing through said second winding generating a unidirectional flux following a third path through said first portion, said first leg, said second portion and said second leg and a fourth path through said first portion, said fourth leg, said second portion and said third leg; said fluxes being in opposing relationship in said first and third legs and in additive relationship in said second and fourth legs during the first half cycle of said alternating current, and in opposing relationship in said second and fourth legs and in additive relationship in said first and third legs during the second half cycle of said alternating current whereby on either half cycle of said alternating current each of said first and second paths includes one opposing flux leg and one additive flux leg whereby the average permeability of each of said first and second paths and the effective inductance of said first winding is dependent on the magnitude of said direct current, the inductance of said first winding increasing if the direct current decreases and decreasing if said direct current increases whereby the current in said output circuit is maintained at a desired value.

64. A system for producing a regulated AC voltage comprising: an unregulated AC voltage source; first and second inductance means; a pair of output terminals; a first magnetic core having a four common regions and two end regions magnetically joining said common regions; a load winding wound on said first core between the first and the fourth and the second and the third of said common regions; means coupling said unregulated AC voltage source in series with said load winding of said first core and a first of said inductance means; a second magnetic core having four common regions and two end regions magnetically joining said common regions; a load winding wound on said second core between the first and the fourth and the second and the third of said common regions; means coupling said load winding of said second core and said second inductance means in series across said load winding of said first core and said first inductance means, said load winding of said second core and said second inductance means being connected in reverse order of said load winding of said first core and said first inductance means whereby an alternating current is passed through said load winding of said first core and said first inductance means and through said load winding of said second core and said second inductance means; means coupling said output terminals to the junction of said load winding of said first core and said first inductance means and the junction of said second inductance means and said load winding of said second core respectively; a control winding wound on said first core between said first and second and third and fourth common regions; a control winding wound on said second core between said first and second and third and fourth common regions; means for sensing the voltage across said output terminals; a reference voltage supply; means for comparing said sensed voltage with said reference voltage; means coupling said control winding of each of said first and second cores to said comparing means whereby a direct current is passed through said control windings, the magnitude of said direct current decreasing if said sensed voltage drops below said reference voltage and increasing if said sensed voltage exceeds said reference voltage, variations in said direct current causing variations in the inductance of each of said load windings, the inductance of said load windings increasing if said direct current decreases and decreasing if said direct current increases.

65. A system for amplifying a DC signal and converting it to an AC signal comprising: an AC voltage source; a load; a first ferromagnetic core having four common regions and first and second portions joining said four common regions, a first winding wound on said first core with its axis extending between said first and second common regions and between said third and fourth common regions; means coupling said first winding of said first core in series between said AC voltage source and said load whereby an alternating current is passed through said first winding of said first core and an alternating magnetic flux is generated in said first core; a second winding wound on said first core with its axis extending between said first and second common regions and between said second and third common regions; a second ferromagnetic core having four common regions and first and second portions joining said four common regions; a first winding wound on said second core with its axis extending between said first and second common regions and between said third and fourth common regions; means coupling said first winding of said second core in shunt with said load whereby an alternating current is passed through said first winding of said second core and an alternating magnetic flux is generated in said second core; a second winding wound on said second core with its axis extending between said first and second common regions and between said second and third common regions; means responsive to said DC signal for producing a first direct current output which increases in response to said signal and a second direct current output which decreases in response to said signal; means coupling said second winding of said first core to said first direct current output whereby a direct current passes through said second winding of said second core and a unidirectional magnetic flux is generated in said core, said unidirectional flux acting to maintain the magnetic circuit encompassed by said first winding of said first core in a non-saturated condition whereby the average permeability of said magnetic circuit and the effective inductance of said first winding of said first core are controlled by the magnitude of said first output, and means coupling said second winding of said second core to said second direct current output whereby a direct current passes through said second winding and a unidirectional magnetic flux is generated in said second core, said second flux acting to maintain the magnetic circuit encompassed by said first winding of said second core in a non-saturated condition whereby the average permeability of said magnetic circuit and the effective inductance of said first winding of said second core are controlled by the magnitude of said second output.

66. A system for amplifying a DC signal and converting it to an AC signal comprising: an AC voltage source; a load; a first ferromagnetic core, a first winding wound on said first core; means coupling said first winding of said first core in series between said AC voltage source and said load whereby an alternating current is passed through said first winding of said first core and an alternating magnetic flux is generated in said first core, said alternating flux following first and second paths in said first core; a second winding wound on said first core; a second ferromagnetic core; a first winding wound on said second core; means coupling said first winding of said second core in shunt with said load whereby an alternating current is passed through said first winding of said second core and an alternating magnetic flux is generated in said second core, said alternating flux following first and second paths in said second core; a second winding wound on said second core; means responsive to said DC signal for producing a first direct current output which increases in response to said signal and a second direct current output which decreases in response to said signal; means coupling said second winding of said first core to said first direct current output, direct current passing through said second winding of said first core generating a unidirectional magnetic flux in said first core, said unidirectional flux following third and fourth paths in said first core; said first path sharing a first common region in said first core with said third path and a second common region in said first core with said fourth path, said second path sharing a third common region in said first core with said third path and a fourth common region in said first core with said fourth path, said fluxes being in opposing relationship in two of said common regions whereby the reluctance of said common regions is reduced, and in additive relationship in the other two of said common regions whereby the reluctance of said other two common regions is increased, each of said first, second, third and fourth paths including one opposing flux common region and one additive flux common region whereby the average permeability of each of said first and second paths and the effective inductance of said first winding of said first core are controlled by the magnitude of said first output; means coupling said second winding of said second core to said second direct current output, direct current passing through said second winding of said second core generating a unidirectional magnetic flux in said second core, said unidirectional flux following third and fourth paths in said second core; said first path sharing a first common region in said second core with said third path and a second common region in said second core with said fourth path, said second path sharing a third common region in said second core with said third path and a fourth common region in said second core with said fourth path, said fluxes being in opposing relationship in two of said common regions whereby the reluctance of said common regions is reduced, and in additive relationship in the other two of said common regions whereby the reluctance of said other two common regions is increased, each of said first, second, third and fourth paths including one opposing flux common region and one additive flux common region whereby the average permeability in each of said first and second paths and the effective inductance of said first winding of said second core are controlled by the magnitude of said second output.

67. A system for amplifying a DC signal and converting it to an AC signal comprising: an AC voltage source; a load; a first ferromagnetic core having four symmetrical legs and first and second portions joining said four legs; a first winding wound on said first core; means coupling said first winding of said first core in series between said AC voltage source and said load whereby an alternating current is passed through said first winding of said first core and an alternating magnetic flux is generated in said first core, said alternating flux following a first path through said first portion, said first leg, said second portion and said fourth leg, and a second path through said first portion, said second leg, said second portion, and said third leg; a second winding wound on said first core; a second ferromagnetic core having four symmetrical legs and first and second portions joining said four legs; a first winding wound on said second core; means coupling said first winding of said second core in shunt with said load whereby an alternating current is passed through said first winding of said second core and an alternating magnetic flux is generated in said second core, said alternating flux following a first path through said first portion, said first leg, said second portion and said fourth leg, a second path through said first portion, said second leg, and second portion and said third leg; a second winding wound on said second core; means responsive to said DC signal for producing a first direct current output which increases in response to said signal and a second direct current output which decreases in response to said signal; means coupling said second winding of said first core to said first direct current output, direct current passing through said second winding of said first core generating a unidirectional magnetic flux in said first core, said unidirectional flux following a third path through said first portion, said first leg, said second portion and said second leg and a fourth path through said first portion, said fourth leg, said second portion and said third leg; said fluxes in said first core being in opposing relationship in said first and third legs and in additive relationship in said second and fourth legs during the first half cycle of said alternating current, and in opposing relationship in said second and fourth legs and in additive relationship in said first and third legs during the second half cycle of said alternating current whereby on either half cycle of said alternating current each of said first and second paths include one opposing flux leg and one additive flux leg whereby the average permeability of each of said first and second paths and the effective inductance of said first winding of said first core are controlled by the magnitude of said first output; and means coupling said second winding of said second core to said second direct current output, direct current passing through said second winding of said second core generating a unidirectional magnetic flux in said second core, said unidirectional flux following a third path through said first portion, said first leg, said second portion, and said second leg and a fourth path through said first portion, said fourth leg, said second portion and said third leg; said fluxes being in opposing relationship in said first and third legs and in additive relationship in said second and fourth legs during the first half cycle of said alternating current, and in opposing relationship in said second and fourth legs and in additive relationship in said first and third legs during the second half cycle of said alternating current whereby on either half cycle of said alternating current each of said first and second paths includes one opposing flux leg and one additive flux leg whereby the average permeability of each of said first and second paths and the effective inductance of said second winding of said second core are controlled by the magnitude of said second output.

68. A system for producing a variable level regulated AC voltage comprising: an unregulated AC voltage source; first and second inductance means; a pair of output terminals; a first ferromagnetic core having four common regions and first and second portions joining said four common regions; a first winding wound on said core with its axis extending between said first and second common regions and between said third and fourth common regions; means coupling said unregulated AC voltage source in series with said first winding of said first core and a first of said inductance means; a second ferromagnetic core having four common regions and first and second portions joining said four common regions; a first winding wound on said second core with its axis extending between said first and second common regions and between said third and fourth common regions; means coupling said first winding of said second core and said second inductance means in series across said first winding of said first core and said first inductance means, said first winding of said second core and said second inductance means being connected in reverse order of said first winding of said first core and said first inductance means, whereby an alternating current is passed through said first winding of said first core and said first inductance means and through said first winding of said second core and said second inductance means and an alternating magnetic flux is generated in each of said first and second cores; means coupling said output terminals to the junction of said first winding of said first core and said first inductance means and the junction of said second inductance means and said first winding of said second core respectively; a second winding wound on said first core with its axis extending between said first and fourth common regions and between said second and third common regions; a second winding wound on said second core with its axis extending between said first and fourth common regions and between said second and third common regions; means for sensing the voltage across said output terminals; an adjustable reference voltage supply; means for comparing said sensed voltage with said reference voltage; means coupling said second winding of each of said first and second cores to said comparing means whereby a direct current is passed through said second windings, the magnitude of said direct current decreasing if said sensed voltage drops below said reference voltage and increasing if said sensed voltage exceeds said reference voltage; said direct current passing through said second winding of each core generating a unidirectional magnetic flux in each core, said unidirectional flux in each core acting to maintain the magnetic circuit encompassed by said first winding of each core in a non-saturated condition whereby the average permeability of said magnetic circuit and the effective inductance of said first windings are controlled by the magnitude of said direct current, the inductance of said first windings increasing if said direct current decreases and decreasing if said direct current increases.

69. A system for producing a variable level regulated AC voltage comprising: an unregulated AC voltage source; first and second inductance means; a pair of output terminals; a first ferromagnetic core; a first winding wound on said first core; means coupling said unregulated AC voltage source in series with said first winding and a first of said inducance means; a second ferromagnetic core; a first winding wound on said second core; means coupling said first winding of said second core and said second inductance means in series across said first winding of said first core and said first inductance means, said first winding of said second core and said second inductance means being connected in reverse order of said first winding of said first core and said first inductance means whereby an alternating current is passed through said first winding of said first core and said first inductance means and through said first winding of said second core and said second inductance means and an alternating magnetic flux is generated in each of said first and second cores, said alternating flux following first and second paths in said cores; means coupling said output terminals to the junction of said first winding of said first core and said first inductance means and the junction of said second inductance means and said first winding of said second core respectively; a second winding wound on said second core; means for sensing the voltage across said output terminals, an adjustable reference voltage supply; means for comparing said sensed voltage with said reference voltage; means coupling said second winding of each of said first and second cores to said comparing means whereby a direct current is passed through said second windings, the magnitude of said direct current decreasing if said sensed voltage drops below said reference voltage and increasing if said sensed voltage exceeds said reference voltage, said direct current passing through said second winding of each core generating a unidirectional magnetic flux in each core, said unidirectional flux following third and fourth paths in said cores; said first path in each core sharing a first common region in said core with said third path therein and a second common region in said third core with said fourth path therein, said second path in each core sharing a third common region in said core with the third path therein and a fourth common region in said core with said fourth path therein, said fluxes being in opposing relationship in two of said common regions in each core whereby the reluctance of said common regions is reduced, and an additive relationship in the other two of said common regions in each core whereby the reluctance of said other two common regions is increased, each of said first, second, third and fourth paths of each core including one opposing flux common region and one additive flux common region whereby the average permeability of each of said first and second paths in each core and the effective inductance of said first winding of each core are controlled by the magnitude of said direct current, the inductance of said first windings increasing if said direct current decreases and decreasing if said direct current increases.

70. A system for producing a variable level regulated AC voltage comprising: an unregulated AC voltage source; first and second inductance means; a pair of output terminals; a first ferromagnetic core having four symmetrical legs and first and second portions joining said four legs; a first winding wound on said first core; means coupling said unregulated AC voltage source in series with said first winding of said first core and a first of said inductance means; a second ferromagnetic core having four symmetrical legs and first and second portions joining said four legs; a first winding wound on said second core; means coupling first winding of said second core and said second inductance means in series across said first winding of said first core and said first inductance means, said first winding of said second core and said second inductance means being connected in reverse order of said first winding of said first core and said first inductance means whereby an alternating current is passed through said first winding of said first core and said first inductance means and through said first winding of said second core and said second inductance means and an alternating magnetic flux is generated in each of said first and second cores; said alternating flux in each core following a first path through said first portion, said first leg, said second portion and said fourth leg and a second path through said first portion, said second leg, said second portion and said third leg; means coupling said output terminals to the junction of said first winding of said first core and said first inductance means and the junction of said second inductance means and said first winding of said second core respectively; a second winding wound on said second core; means for sensing the voltage across said output terminals; an adjustable reference voltage supply; means for comparing said sensed voltage with said reference voltage; means coupling said second winding of each of said first and second cores to said comparing means whereby a direct current is passed through said second windings, the magnitude of said direct current decreasing if said sensed voltage drops below said reference voltage and increasing if said sensed voltage exceeds said reference voltage, said direct current passing through said second windings generating a unidirectional magnetic flux in each of said cores, said unidirectional flux following a third path through said first portion, said first portion, said first leg, said second portion and said second leg and a fourth path through said first portion, said fourth leg, said second portion and said third leg; said fluxes being in opposing relationship in said first and third legs and in additive relationship in said second and fourth legs during the first half cycle of said alternating current, and in opposing relationship in said second and fourth legs and in additive relationship in said first and third legs during the second half cycle of said alternating current whereby on either half cycle of said alternating current each of said first and second paths include one opposing flux leg and one additive flux leg whereby the average permeability of each of said first and second paths in each core and the effective inductance of the first winding of each core are controlled by the magnitude of said direct current, the inductance of said first windings increasing if said direct current decreases and decreasing if said direct current increases.

71. A system for controlling the coupling between an input circuit and an output circuit, comprising: a source of AC voltage; means coupling said source to said output circuit; a magnetic core having four common regions and two end regions magnetically joining said common regions; a primary winding wound on said core between the first and the fourth and the second and the third of said common regions; means coupling said primary winding to said input circuit whereby an alternating current is passed through said primary winding; a control winding wound on said core between said first and second and third and fourth common regions; a source of direct current; means coupling said source of direct current to said control winding; a secondary winding wound on said core between said first and second and said third and fourth common regions; means coupling said secondary winding to said output circuit, the presence of direct current in said control winding causing coupling to occur between said primary and secondary windings and a current to be induced in said output circuit.

72. The system of claim 71 wherein said source of direct current includes rectifying means connected across said source of AC voltage and wherein said means coupling said source of direct current to said control winding includes a potentiometer connected across the output of said rectifying means.

73. A system for controlling the coupling between an input circuit and an output circuit, comprising: a source of AC voltage; means coupling said source to said input circuit; a ferromagnetic core having four common regions and first and second portions joining said four common regions; a first winding wound on said core with its axis extending between said first and second common regions and between said third and fourth common regions; means coupling said first winding to said input circuit whereby an alternating current is passed through said first winding and an alternating magnetic flux is generated in said core; a second winding wound on said core with its axis extending between said first and fourth common regions and between said second and third common regions; a source of direct current; means coupling said source of direct current to said second winding, direct current passing through said second winding generating a unidirectional magnetic flux in said core; a third winding wound on said core with its axis extending between said first and fourth common regions and between said second and third common regions; means coupling said third winding to said output circuit; said unidirectional flux generated by said second winding interacting with said alternating flux generated by said first winding to develop a voltage in said third winding, the magnitude of said developed voltage being controlled by the magnitude of said unidirectional flux.

74. The system of claim 73 wherein said source of direct current includes rectifying means connected across said source of AC voltage and wherein said means coupling said source of direct current to said second winding includes a potentiometer connected across the output of said rectifying means.

75. The system of claim 73 wherein a fourth winding is wound on said core with its axis extending between said first and second common regions and between said third and fourth common regions.

76. The system of claim 75 wherein means are provided for supplying direct current to said fourth winding whereby a further unidirectional magnetic flux is generated in said core, said further unidirectional flux having a magnitude greater than the maximum magnitude of said alternating flux.

77. The system of claim 76 wherein said source of direct current includes rectifying means connected across said source of AC voltage; said means coupling said source of direct current to said second winding includes a first potentiometer connected across the output of said rectifying means and wherein said means for supplying a direct current to said fourth winding includes a second potentiometer connected across said rectifying means.

78. A system for controlling the coupling between an input circuit and an output circuit comprising: a source of AC voltage; means coupling said source to said input circuit; a ferromagnetic core; a first winding wound on said core; means coupling said first winding to said input circuit whereby an alternating current is passed through said first winding and an alternating magnetic flux is generated in said core, said alternating flux following first and second paths in said core; a second winding wound on said core; a source of direct current; means coupling said source of direct current to said second winding, direct current passing through said second winding generating a unidirectional magnetic flux in said core, said unidirectional flux following third and fourth paths in said core; said first path sharing a first common region in said core with said third path and a second common region in said core with said fourth path, said second path sharing a third common region in said core with said third path and a fourth common region in said core with said fourth path, said fluxes being in opposing relationship in two of said common regions whereby the reluctance of said common regions is reduced, and in additive relationship in the other two of said common regions whereby the reluctance of said other two common regions is increased, each of said first, second, third and fourth paths including one opposing flux common region and one additive flux common region; a third winding wound on said core, said third winding being inductively coupled to said second winding and being responsive to the interaction of said fluxes for producing an output voltage; and means coupling said third winding to said output circuit, the magnitude of said produced voltage being controlled by the magnitude of said unidirectional flux.

79. The system of claim 78 wherein said source of direct current includes rectifying means connected across said source of AC voltage and wherein said means coupling said source of direct current to said second winding includes a potentiometer connected across the output of said rectifying means.

80. The system of claim 78 wherein a fourth winding is wound on said core with its axis parallel to the axis of said first winding.

81. The system of claim 80 wherein means are provided for supplying direct current to said fourth winding whereby a further unidirectional magnetic flux is generated in said core, said further unidirectional flux following said first and second paths in said core and having a magnitude greater than the maximum magnitude of said alternating flux.

82. The system of claim 81 wherein said source of direct current includes rectifying means connected across said source of AC voltage; said means coupling said source of direct current to said second winding includes a first potentiometer connected across the output of said rectifying means and wherein said means for supplying a direct current to said fourth winding includes a second potentiometer connected across said rectifying means.

83. A system for controlling the coupling between an input circuit and an output circuit comprising; a source of AC voltage; means coupling said source to said input circuit; a ferromagnetic core having four symmetrical legs and first and second portions joining said four legs; a first winding wound on said core; means coupling said first winding to said input circuit whereby an alternating current is passed through said first winding and an alternating magnetic flux is generated in said core, said alternating flux following a first path in said core through said first portion, said first leg, said second portion and said fourth leg, and a second path through said first portion, said second leg, said second portion and said third leg; a second winding wound on said core; a source of direct current; means coupling said source of direct current to said second winding, direct current passing through said winding generating a unidirectional magnetic flux in said core, said unidirectional flux following a third path through said first portion, said first leg, said second portion and said second leg and a fourth path through said first portion, said fourth leg, said second portion and said third leg; said fluxes being in opposing relationship in said first and third legs and in additive relationship in said second and fourth legs during the first half cycle of said alternating current, and in opposing relationship in said second and fourth legs and in additive relationship in said first and third legs during the second half cycle of said alternating current whereby on either half cycle of said alternating current each of said first and second paths includes one opposing flux leg and one additive flux leg; a third winding wound on said core to intersect said third and fourth paths for producing an output voltage in response to interaction of said fluxes; and means coupling said third winding to said output circuit, the magnitude of said produced voltage being dependent on the magnitude of said unidirectional flux.

84. The system of claim 83 wherein said source of direct current includes rectifying means connected across said source of AC voltage and wherein said means coupling said source of direct current to said second winding includes a potentiometer connected across the output of said rectifying means.

85. The system of claim 83 wherein a fourth winding is wound on said core with its axis parallel to the axis of said first winding.

86. The system of claim 85 wherein means are provided for supplying direct current to said fourth winding whereby a further unidirectional magnetic flux is generated in said core, said further unidirectional flux following said first and second paths in said core and having a magnitude greater than the maximum magnitude of said alternating flux.

87. The system of claim 86 wherein said source of direct current includes rectifying means connected across said source of AC voltage; said means coupling said source of direct current to said second winding includes a first potentiometer connected across the output of said rectifying means and wherein said means for supplying a direct current to said fourth winding includes a second potentiometer connected across said rectifying means.

88. A low frequency power controlling circuit comprising: an iron core transformer including a primary winding, an intermediate winding having an axis perpendicular to said primary winding, and a secondary winding having an axis parallel to the axis of said intermediate winding; an input circuit for applying AC power to said primary winding; means for deriving a DC bias signal from said input circuit; an intermediate winding bias circuit for establishing the DC level of the current applied to said intermediate winding; means for coupling an output circuit to said secondary winding; the bias levels provided by said circuits being selected so that the total magnetic field created by all currents passing through all windings is not sufficient to cause staturation in said core; and means associated with said intermediate winding to effect a linear control of the AC power transfer from said primary winding to said secondary winding.

89. An electronically variable AC power supply comprising: an iron core transformer including a primary winding, an intermediate winding having an axis perpendicular to said primary winding, and a secondary winding having an axis parallel to the axis of said intermediate winding; first means for applying an input signal to said primary winding; second means for receiving said input signal and for producing a DC biasing signal for said primary winding; third means for receiving said input signal and for producing a DC biasing signal for said intermediate winding; means for deriving an output signal from said secondary winding; and means for controlling the amount of DC bias applied to said intermediate winding, whereby the AC power transfer from said primary winding to said secondary winding is accomplished as a linear function of the DC bias applied to said secondary winding, said iron core being operated within its linear transfer characteristic reaction where no saturation occurs.

90. The electronically variable AC power supply defined in claim 89 wherein said second means includes a rectifier for producing a DC signal from an AC input signal and a filter circuit for producing a smoothed DC signal, the smooth DC signal applied to said primary winding being selected to provide sufficient flux through said primary winding to prevent the AC flux variations from changing sign, whereby said supply provides output power at the same frequency as the AC input power.

91. A low frequency power transfer circuit comprising: a transformer including a ferromagnetic core, primary and secondary windings wound on said core with transverse axis and an intermediate winding on said core having an axis parallel to said secondary winding; first means for applying low frequency alternating current power to said primary winding; second means for applying a direct current signal to said intermediate winding, the level of said direct current signal being such that the total flux vector in said core does not cause saturation; and means for deriving alternating current output power from said secondary winding, said direct current signal amplitude providing a direct linear control of the power transfer from said primary winding to said secondary winding.

92. The power transfer circuit defined in claim 91 wherein there is additionally provided a primary bias circuit for supplementing the primary flux with a direct current component sufficient to prevent the primary flux from changing sign; whereby the secondary power derived has a frequency equal to that of the primary frequency.

References Cited

UNITED STATES PATENTS

| | | | |
|---|---|---|---|
| 3,238,517 | 3/1966 | Woods | 340—174 |
| 3,259,888 | 7/1966 | Cornely et al. | 340—174 |
| 3,289,179 | 11/1966 | Elfant et al. | 340—174 |
| 1,376,978 | 5/1921 | Stoekle | 323—56 |
| 1,793,213 | 2/1931 | Dowling | 323—56 |
| 2,445,857 | 7/1948 | McCreary | 323—89 |
| 2,703,388 | 3/1955 | McCreary | 330—84 |
| 2,814,786 | 11/1957 | Naul | 336—110 |
| 2,820,109 | 1/1958 | Dewitz | 323—89 |
| 2,883,605 | 4/1959 | Mortimer | 321—68 |
| 2,987,667 | 6/1961 | Lipkin | 323—89 |
| 3,056,118 | 9/1962 | Woods | 340—174 |
| 3,061,820 | 10/1962 | Wanlass | 340—174 |
| 3,093,817 | 6/1963 | Rajchman et al. | 323—89 X |
| 3,106,702 | 10/1963 | Haynes et al. | 340—174 |
| 3,134,964 | 5/1964 | Wanlass | 340—174 |
| 2,983,829 | 5/1961 | Wanlass | 307—88 |
| 2,985,768 | 5/1961 | Bobeck | 307—88 |
| 3,088,039 | 4/1963 | Wanlass | 307—88 |
| 3,097,305 | 7/1963 | Wanlass | 307—88 |
| 3,124,785 | 3/1964 | Wanlass | 340—174 |
| 2,443,006 | 6/1948 | Johnson | 323—89 |
| 2,486,250 | 10/1949 | Bixby | 323—89 |
| 3,110,857 | 11/1963 | Lafuze | 323—89 |
| 2,939,068 | 5/1960 | Alizon et al. | 321—25 |
| 3,048,767 | 8/1962 | Smeltzer | 321—25 |
| 2,883,604 | 4/1959 | Mortimer | 321—68 |
| 2,927,260 | 3/1960 | Prywes | 321—68 |
| 2,311,796 | 2/1943 | Wrathall | 332—29 |
| 2,919,416 | 12/1959 | Jones | 332—29 |
| 2,862,188 | 11/1958 | Misek | 332—51 |
| 2,990,521 | 6/1961 | Tominaga | 332—51 |
| 3,007,120 | 10/1961 | Ferrar | 332—51 |

MILTON O. HIRSHFIELD, *Primary Examiner.*

WARREN E. RAY, *Assistant Examiner.*